United States Patent
Kirk, III

(10) Patent No.: US 6,421,690 B1
(45) Date of Patent: Jul. 16, 2002

(54) COMPUTER MEMORY MANAGEMENT SYSTEM

(75) Inventor: Whitson John Kirk, III, Greenwood, MO (US)

(73) Assignee: Honeywell International Inc., Morris Township, NJ (US)

( * ) Notice: Subject to any disclaimer, the term of this patent is extended or adjusted under 35 U.S.C. 154(b) by 0 days.

(21) Appl. No.: 09/301,909

(22) Filed: Apr. 29, 1999

Related U.S. Application Data

(60) Provisional application No. 60/083,665, filed on Apr. 30, 1998.

(51) Int. Cl.$^7$ .............................................. G06F 12/00
(52) U.S. Cl. .................. 707/206; 707/200; 707/100; 707/102; 711/161; 709/331
(58) Field of Search ................. 707/206, 100, 707/101, 102, 103, 200, 201, 204, 205; 709/331; 711/161, 162

(56) References Cited

U.S. PATENT DOCUMENTS

| | | | |
|---|---|---|---|
| 5,398,334 A | * | 3/1995 | Topka et al. ................. 395/600 |
| 5,560,003 A | | 9/1996 | Nilsen et al. |
| 5,699,539 A | | 12/1997 | Garber et al. |
| 5,727,185 A | | 3/1998 | Mehner |
| 5,729,760 A | | 3/1998 | Poisner |
| 5,742,793 A | | 4/1998 | Sturges et al. |
| 5,751,962 A | | 5/1998 | Fanshier et al. |
| 5,764,980 A | | 6/1998 | Davis et al. |
| 5,765,174 A | * | 6/1998 | Bishop ....................... 707/206 |
| 5,802,605 A | | 9/1998 | Alpert et al. |
| 5,829,025 A | | 10/1998 | Mittal |
| 5,829,053 A | | 10/1998 | Smith et al. |

* cited by examiner

*Primary Examiner*—Hosain T. Alam
*Assistant Examiner*—Joon Hwan Hwang
(74) *Attorney, Agent, or Firm*—Hovey Williams LLP

(57) ABSTRACT

A computer memory management system utilizing a memory structure system of "intelligent" pointers in which information related to the use status of the memory structure is designed into the pointer. Through this pointer system, The present invention provides essentially automatic memory management (often referred to as garbage collection) by allowing relationships between objects to have definite memory management behavior by use of coding protocol which describes when relationships should be maintained and when the relationships should be broken. In one aspect, the present invention system allows automatic breaking of strong links to facilitate object garbage collection, coupled with relationship adjectives which define deletion of associated objects. In another aspect, The present invention includes simple-to-use infinite undo/redo functionality in that it has the capability, through a simple function call, to undo all of the changes made to a data model since the previous 'valid state' was noted.

19 Claims, 10 Drawing Sheets

COMPUTER MEMORY MANAGEMENT SYSTEM

This patent is entitled to priority pursuant to Provisional U.S. Patent application No. 60/083,665 filed Apr. 30, 1998.

The U.S. Government has rights in this invention pursuant to Contract DE-AC04-76-DP00613 with the United States Department of Energy.

BACKGROUND OF THE INVENTION

FIELD OF THE INVENTION

This invention relates generally to systems for managing memory usage in electronic computing systems utilizing object-oriented technology. More particularly, the present invention is a computer programming system which allows development of computer memory pointer information, providing enhanced memory management functionality. This information may, for example, be utilized to automatically determine when memory links may be broken, freeing up computer memory.

MEMORY MANAGEMENT

Many computer languages contain features that assist in memory management for modern digital computers, especially in object-oriented environments, such as with $C^{++Tm}$ programs. Typically in an object-oriented environment, any time a given object is no longer referenced anywhere in a program, it is considered 'garbage' and is 'cleaned-up' at the first convenient opportunity. However, the program must be coded to know how and when to break all references to a given object that is to be deleted.

One complication to such memory management occurs when the primary uses of an object cease, although less significant references to the object are still present. Such a situation can prevent cleanup of the program objects which would normally be considered garbage. In effect, in such a situation there are two different basic classes of relationships. First, there are references which claim 'ownership' of the objects to which they point. That is, while the reference exists to the object, the object should not be garbage collected. Secondly, there are references which do not claim 'ownership' of any kind. The objects to which they refer may be eliminated at any point, although the referring objects may need to be informed of the changed situation. Further, if the referenced objects are garbage-collected, the references (pointers) to the eliminated objects must be 'broken' (Led out) to prevent dangling pointer problems.

An approach to addressing the cleanup of such objects has been to use a two-tier pointer scheme in which "strong" pointers and "weak" pointers are used to reference to objects. Generally, such memory management systems are allowed to consider objects to be garbage which do not have any strong references, regardless whether weak references are present. Such systems are identified in U.S. Pat. No. 5,560,003, assigned to Iowa State University Research Foundation Inc. (the "'003 patent") and U.S. Pat. No. 5,765,174, assigned to Sun Microsystems, Inc. (the "'174 patent"), each of which is incorporated herein by reference.

Distinguishing between such weak and strong (or non-owning and owning) relationships, clearly assists in memory management by allowing garbage collection of weak referenced objects. However, in complex applications that distinction alone can be inadequate because the classical implementation of a weak pointer is that it is simply a pointer which does not prevent the garbage collection of the referenced object. Such pointers are commonly simply nulled (set to NULL) upon the referenced object's death. The object containing the weak pointer is not immediately informed of the action and, indeed, many systems provide no form of notification to the application whatsoever. Since altering the internal data of an object without that object's knowledge or consent breaks the object-oriented concept of encapsulation, weak pointers which do not inform their containing objects of their change in state are incompatible with fundamental object-oriented programming principles and concepts.

Moreover, there are other functional considerations reflecting upon use of memory management techniques. For example, sophisticated computer systems typically incorporate undo/redo functionality to assist the programmer/user by buffering unwanted actions. Undo/Redo systems are difficult to implement in current systems using weak/strong pointer technology.

One significant limitation of the current memory management systems is that the system designer has only very limited control over the destruction of objects. In other words, the systems prevent destruction of objects while any strong links exist. Utilization of strong and weak links provides partial solution to the problem by allowing destruction of items with weak links, however, a system designer lacks the tools to determine in advance when such memory management is occurring. Basically, the memory management system runs entirely in the background and is not available as an active programming device and, therefore, the current memory management approaches lack design flexibility.

Since the garbage collectors in languages having automatic memory management perform their tasks at unpredictable times, the collection times of the referenced objects are nondeterministic (and therefore difficult or impossible to use in many situations).

Thus, there is a need for a memory management system to facilitate computer system memory management design and implementation and address the various problems discussed herein.

SUMMARY OF THE INVENTION

The present invention is a Generic Memory Management System (referred to herein as GeMS) which defines relational schemes for memory pointers in object-based computer systems. GeMS includes a system of attributes associated with system references (pointers), thus creating a set of "smart pointers." These attributes preferably are effected through a set of flags associated with the pointers, although generally any tagging methodology would be suitable. As discussed further below, in various embodiments include one or more of the attributes referred to herein as ownership, registered, alpha, omega, and ghost attributes.

In contrast with previous memory management schemes, the behavior of a GeMS smart pointer can be controlled by setting or clearing the flags contained within it. Thus, GeMS provides a computer system designer the tools (by means of the smart pointer flags) to determine when and how a system will perform garbage collection. A key feature of GeMS is that the GeMS explicitly controls when objects should 'die' and/or be deleted based on the relationships such objects have with other objects and the types (e.g., flags) of those relationships. As a result, for example, a computer program designer (i.e., programmer, developer or designer) using GeMS can now easily determine that a set of objects be linked to be deleted when threshold events occur.

Viewed from the perspective of a computer program developer/designer using GeMS; GeMS provides tools to allow a designer to efficiently determine how memory management will occur. Referring to FIGS. 1 and 5, it is noted that, for practical reasons, objects whose memory is to be managed by GeMS will be contained in a common base class, herein named GObject. Relations between GObjects are created using 'smart pointers' herein named SmartPtr. Every GObject maintains a tabulation of all SmartPtrs that reference it. In GeMS, how long a GObject 'lives' is based on the relationships it has with other GObjects, which relationships may be designed into the system by the designer in implementing the smart pointers. (In contrast, in typical memory management schemes in use today, an object will live as long as there are any references to it from anywhere in the application.)

GeMS incorporates the known concept of strong and weak relationships, but, in addition GeMS preferably can also determine when strong relationships should be broken based on additional adjectives that can be applied to the SmartPtrs by the application developer/designer. The preferred adjectives are named herein 'alpha' and 'omega'. Thus, all smart pointers are still either 'strong' or 'weak', but may optionally also be 'alpha' and/or 'omega' pointers as well. (Alpha and omega functions link deletion of objects to other objects). Thus, in contrast to typical systems using weak and strong pointers, GeMS allows a designer to explicitly override existing strong relations and cause deletion of an object. Further, part of the preferred GeMS provides an express command for use by a designer/programmer to 'kill' any GObject by a simple call to a procedure.

In one aspect, GeMS allows tabulations of smart pointers to be created, so that functions such as alpha and omega may be coordinated. Further, in a preferred aspect, the SmartPtrs referencing the 'killed' GObjects are properly updated and the repercussions of the object's death will automatically ripple throughout the data model.

In one another aspect, GeMS provides an event handling system which enables the application to request important events from a data model when it changes. Thus, GeMS provides the capability to efficiently store a data model's state so that the data model may be taken from one state to an earlier or later state (e.g., an undo/redo functionality).

SHORT DESCRIPTION OF THE FIGURES

DETAILED DESCRIPTION OF THE INVENTION

Contents
 I. Definitions
 II. GeMS Smart Pointer Concepts
 III. Pointer Counting
 IV. Base Class Objects
 V. Wrappers
 VI. Data Model Events
 VII. Streams
 VIII. Undo/Redo Functionality
 IX. Preferred Method Descriptions
 X. Alternative Embodiments I. Definitions In order to help clearly outline the scope of GeMS, below are provided a set of general definitions, as well as GeMS-specific terms used in this document. These terms are used consistent with common usage in the art, although additional or specialized meaning has been attached to specific terms as shown.

A. General Definitions

A "class" is a user-defined data type that defines a collection of objects that share the same characteristics.

'Garbage collection' is a routine that searches memory for program segments or data that are no longer active in order to reclaim that space. Garbage collection includes reference count methods such as are described in the '174 patent.

An "object" is a self-contained module of data and its associated processing. Objects are the software building blocks of object technology.

The term "owning pointer" is generally used interchangeably with the term "strong pointer."

The term "reference" is generally used interchangeably with the term "pointer."

"NULL" is a term used to describe the state of a pointer variable when it references nothing.

A "strong pointer" is a pointer which prevents the garbage collection of the referenced object. Most computer applications written in languages having 'automatic' memory management usually use nothing but strong pointers.

"Use-count" refers to a memory management scheme that uses an integer value on every object to determine the number of pointers referencing the object. When the use-count drops to zero, the object may be freed.

A "weak pointer" is a pointer which does not prevent the garbage collection of the referenced object. Typically, the pointer is set to NULL when the referenced object is collected.

A "dangling pointer" is a pointer variable whose value references a memory location that was previously occupied by an object but whose memory has been freed back to the operating system. In languages where dangling pointers can arise, it is one of a designer's most important (and difficult) tasks to prevent dangling pointers from occurring since use of such pointers often results in program failure.

B. GeMS Specific Definitions

Figure 7:
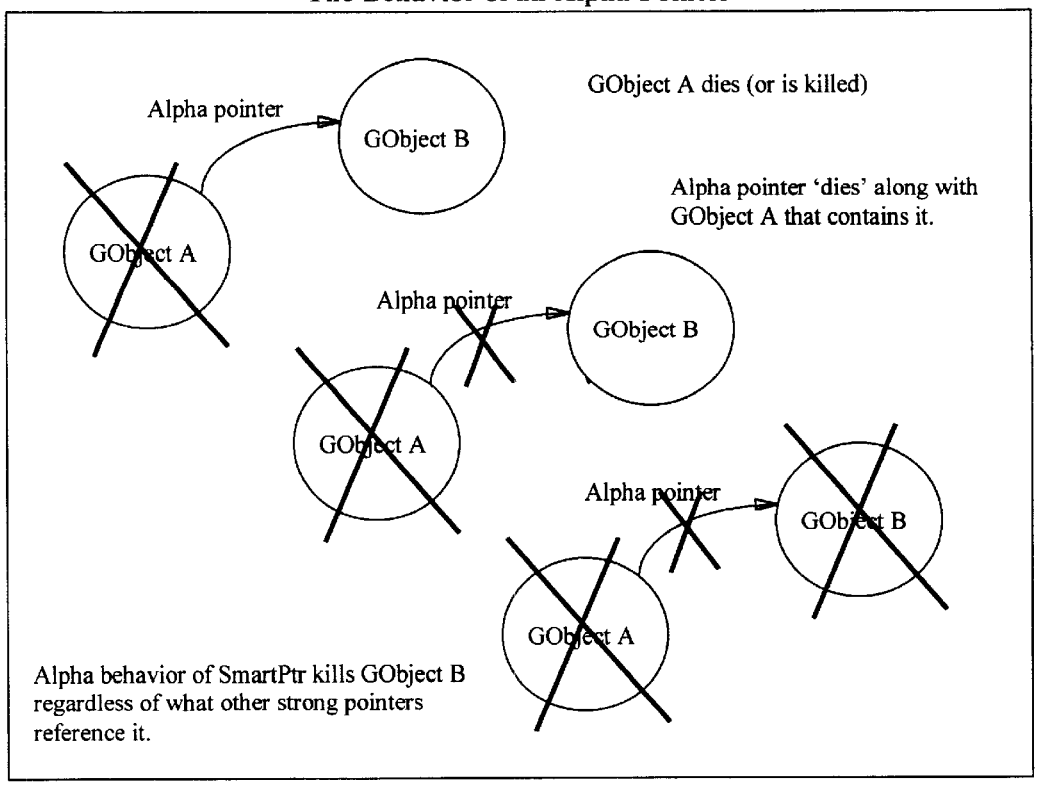
FIG. 7 is a chart demonstrating alpha behavior.

An "alpha " relationship is a relationship that "kills" the object referenced by the relationship upon the relationship's death. Refer to FIG. 7.

"Death" is the point at which an object is no longer referenced by any strong living pointers. (In a preferred aspect in GeMS, this occurs when an object's use-count drops to equal its system count. Further, in a preferred embodiment in GeMS, at an object's death, all living pointers referencing the object are NULLed and all pointers contained within the object are transformed from living references into ghost references.)

"Destruction" is the point at which an object's memory is freed.

A "living reference" is a pointer that is used by or contained within a living object.

A "living object" is an object that is reachable by at least one living strong reference.

A "ghost" pointer/reference does not impart any "living" characteristics to the referenced object. Thus, a "ghost strong reference" does not imply that the referenced object is alive or dead. Rather it merely implies that the object exists.

"ghost object" or "dead object" is an object that is not reachable by any strong living reference, but which is referenced by at least one strong ghost reference. Any references it contains are "ghost" references.

To "kill" refers to the process of breaking any living strong references to an object. When this occurs, the object will 'die.' (In the preferred embodiment, the death triggers breaking of all living weak references to the object.)

Figure 6:
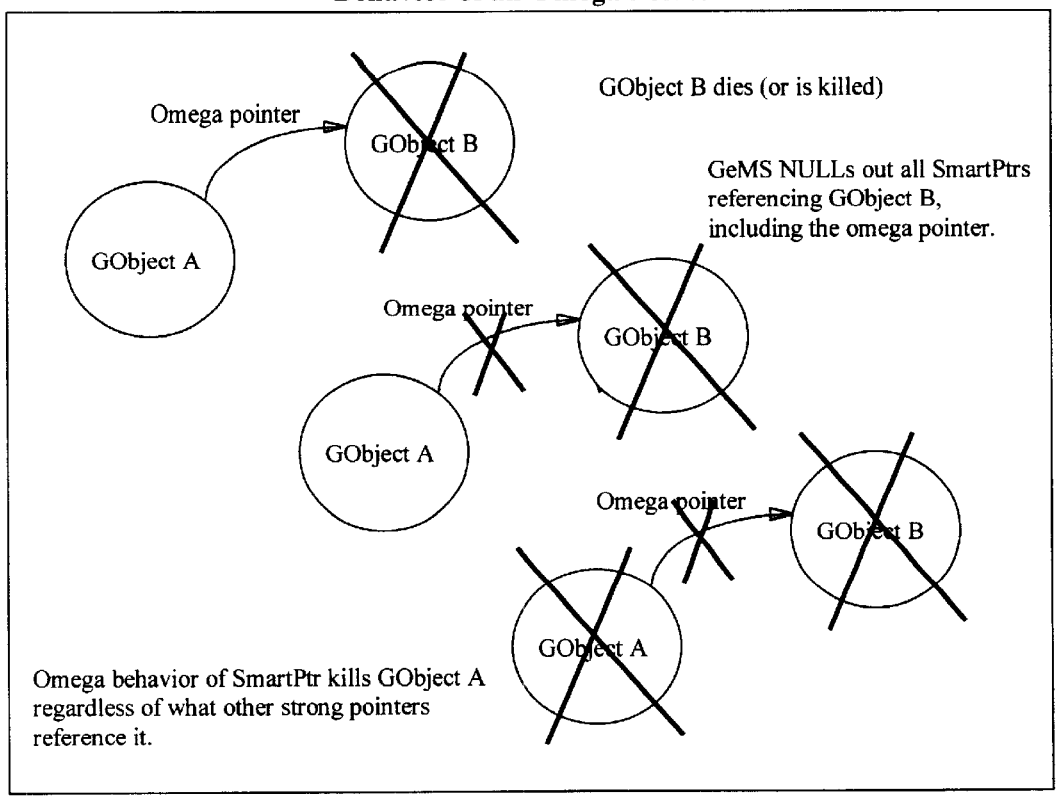
FIG. 6 is a chart demonstrating omega behavior.
Figure 8:
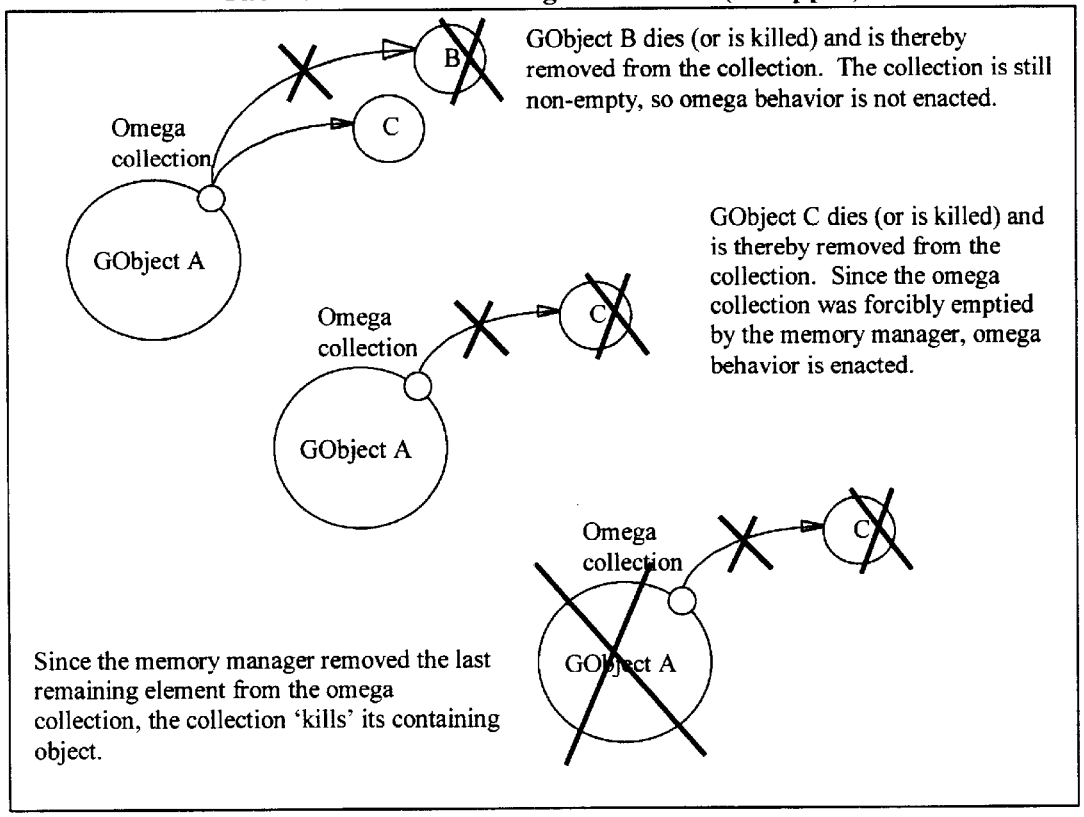
FIG. 8 is a chart demonstrating omega collection behavior.

An "omega" relationship is a relationship that, when broken by the memory manager, "kills" the object containing the relationship. An omega relationship can be defined either by a single pointer, in which case the "killing" action occurs when the memory manager NULLs the pointer, or by an entire collection of pointers, in which case the "killing" action occurs when the memory manager removes the last element contained within the collection. Refer to FIGS. 6 and 8.

"Registration" is the process of adding a pointer into an object's list of 'registered pointers'. A pointer with its registration flag set to true is a registered pointer.

"Resurrection" is the point at which a dead object is once again referenced by a living strong pointer. Upon resurrection, all references contained within the resurrected object are transformed from ghost references to living references.

II. GeMS Smart Pointers Concepts

A. Smart Pointers in GeMS

References between objects using GeMS library are defined through the use of 'smart pointers'. A smart pointer is a class of pointers which performs the same basic task as a normal pointer but which has some added intelligence built into it. In a preferred aspect, the behavior of the basic GeMS smart pointer can be controlled by setting or clearing certain flags contained within it. Having different flags set or cleared changes the characteristics of the relationship represented by the smart pointer. Various embodiments of GeMS perform garbage collection in differing, but determinable, sequences depending on which kinds of relationships exist between the objects operating within the scope of the GeMS system.

B. The Anatomy of a GeMS Smart Pointer

Figure 1:
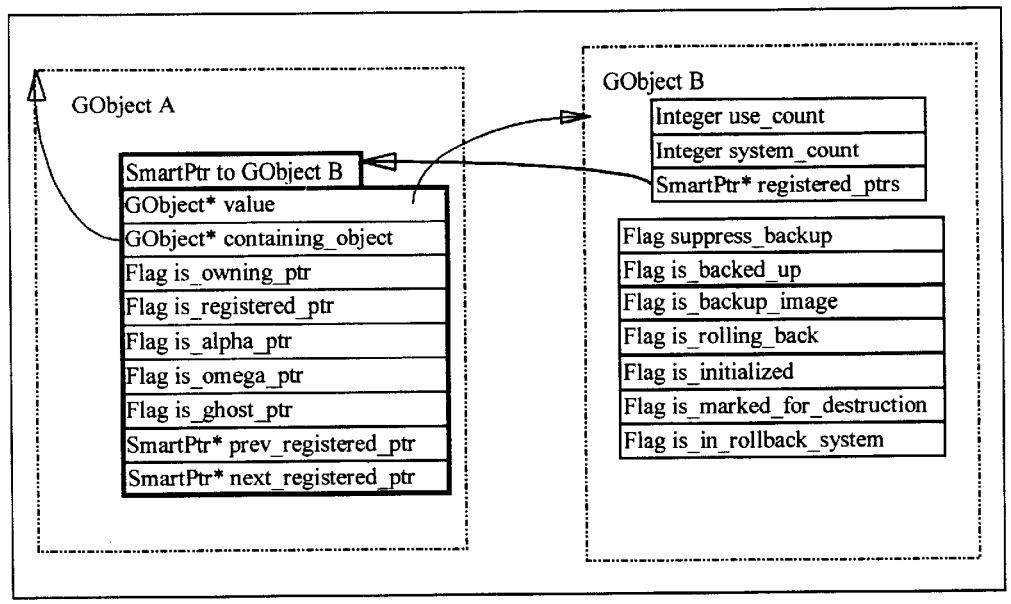
FIG. 1 is a logic chart demonstrating the relationship of various attributes of GeMS Smart pointers to referenced and referencing objects.

Referring to FIG. 1, the most preferred embodiment of GeMS smart pointer (named SmartPtr in FIG. 1) consists of four normal pointers (variables which store memory addresses) and five flags. The SmartPtr contains a standard memory pointer defining value (named 'value' in FIG. 1) which points to some external object. Throughout its lifetime, the SmartPtr must communicate in various ways with the objects to which it refers, so it is important that this value only be set to point to the types of objects with which it knows how to communicate. Thus, commonly, this pointer value will be set to point to only a single specific class which acts as a base class for other classes (shown as GObject in FIG. 1).

The second pointer variable (named 'containing_object' in FIG. 1) is intended to point to the GObject which contains the SmartPtr, if any. This value is set when the containing object is initialized (via the initialize_stream described below). Again, since the smart pointer must communicate with its containing object at various points in its life, this value must be restricted to only point to those object types with which it knows how to communicate (again commonly pointing only to classes of type GObject).

The prev_registered_ptr and next_registered_ptr pointer variables, see FIG. 1, allow smart pointers to be chained together by GeMS in a normal doubly linked-list fashion.

The five flags preferably contained within the SmartPtr (see Table 1) provide it with the information it needs to define its actions throughout its lifetime. The 'is_ghost_ptr' flag is a special flag which alters the specific behaviors demanded by the other four flags. It will be easiest to understand how it affects the operation of the SmartPtr, though, if the other flags are first considered with the 'is_ghost_ptr' flag set to false.

TABLE 1

GeMS FLAGS

| | Ghost Flag = false (alive) | Ghost Flag = true (ghost) |
|---|---|---|
| Owning flag = true | Increment/decrement use count for referenced object | Increment/decrement both use count and system count for referenced object. |
| Owning Flag = false | Do not perform Owning Flag = true operation | Do not perform Owning Flag = true operation |
| Registered Flag = true | register with referenced object (adds pointer to double-linked registered pointer list) | Do not perform Registered Flag = true operation |
| Registered Flag = false | Do not perform Registered Flag = true operation | Do not perform Registered Flag = true operation |
| Alpha Flag = true | Kill referenced object when referencing object dies | Do not perform Alpha = true operation |
| Alpha Flag = false | Do not perform Alpha = true operation | Do not perform Alpha = true operation |
| Omega Flag = true | Kill referencing object when referenced object dies | Do not perform Omega = true operation |
| Omega Flag = false | Do not perform Omega = true operation | Do not perform Omega = true operation |

If the SmartPtr's 'is_owning tr' flag is set to true (and the 'is_ghost_ptr' flag is set to false), the SmartPtr must increment the use-count (named use_count in FIG. 1) of any newly referenced GObject by calling that GObject's use( ) method (described below under GObject's use( ) Method). Subsequently, when the smart pointer is no longer pointing to an object, or when the pointer itself is destroyed, it must decrement the referenced GObject's use-count by calling that object's lose( ) method (described below under GObject's lose( ) Method).

If the SmartPtr's 'is_registered_ptr' flag is set to true (and the 'is_ghost_ptr' flag is set to false), the pointer must 'register' itself with any newly referenced object by calling that object's regisiter_ptr( ) method (described below under GObject's register_ptr( ) Method. This method will use the SmartPtr's 'prev_registered ptr' and 'next_registered_ptr' attributes to add the pointer into the GObject's doubly linked-list of registered pointers. (The first SmartPtr in the doubly-linked list is referenced by the GObject's 'registered_ptrs' attribute.) When the SmartPtr is no longer pointing to the object, or when the pointer itself is destroyed, it must remove itself from the referenced object's registry by calling that object's unregister_ptr( ) method (described below under GObject's unregister_ptr( ) Method).

If the SmartPtr's 'is_alpha_ptr' flag is set to true (and the 'is_ghost_ptr' flag is set to false), it must perform a g_forget( ) (explained later under The g_forget( ) Procedure) on the referenced object when the SmartPtr dies, wherein the g_forget( ) will kill the referenced object. For example, in this preferred alpha function, referring to FIG. 7, for a given GObject A with an alpha pointer which references a given GObject B, if GObject A dies, GeMS will kill the referenced GObject B, regardless what other pointers (strong or otherwise) referenced GObject B.

The 'is omega_ptr' flag should be set only in cases where the smart pointer is contained within some owning object (of type GObject). Consequently, the 'containing_object' pointer will be non-NULL after the containing object has been fully initialized. If the omega flag is set to true (and the 'is_ghost_ptr' flag is set to false), the SmartPtr will request that its containing object be removed from the data model when the pointer's value is changed from non-NULL to NULL by GeMS system. The containing GObject is extracted via a call to g_forget( ) (explained later under The g_forget( ) Procedure). In effect, a SmartPtr with its 'is_omega_ptr' flag set to true is asserting that the very act of its pointing to an object is the reason for its containing GObject's existence. If the SmartPtr no longer references a GObject that thereafter dies, the containing GObject should also die. Referring to FIG. 6, a given omega pointer points to containing GObject B, and GObject B dies or is killed (e.g., by an alpha function) the preferred GeMS nulls all pointers (strong or otherwise) referring to GObject B and, then the omega behavior of the given pointer kills referring GObject A. Note that, as preferably configured, a designer/programmer can alter or NULL out the SmartPtr himself without the drastic action of the containing object being killed. It is only when GeMS system itself NULLs the pointer (e.g., through the GObject's forget( ) method) that these alpha and omega actions occur. (The only time GeMS system NULLs the pointer is when the referenced object dies or is killed.)

As discussed further herein, collections of smart pointers may also be created. One important type of collection is known as an 'omega collection'. An 'omega' collection will 'kill' the GObject containing it when the memory manager forcibly removes its last remaining element, as is graphically depicted in FIG. 8. It should be noted that in all cases, the SmartPtrs referencing the 'killed' GObjects are properly updated and the repercussions of the object's death will automatically ripple throughout the data model.

Finally, the 'is_ghost_ptr' flag alters or overrides the behaviors of the other flags. Specifically, if the 'is_ghost_ptr' flag is set to true, the 'is_registered_ptr', 'is_alpha_ptr', and 'is_omega_ptr' flags are completely overridden so that they have the behavior as if they were set to false. If the 'is_owning_ptr' flag is set to true along with the 'is_ghost_ptr' flag, then the smart pointer will increment the use-count and the system-count (named 'system_count' in FIG. 1) of any newly referenced object by calling its 'increment_system_count( )' method (described below under GObject's increment_system_count( ) Method) rather than call the 'use( )' method (which would be used if the 'is_ghost_ptr' flag were false). Subsequently, when the pointer no longer references the object, or is itself destroyed, the use-count and system-count will be decremented by a call to the referenced object's 'decrement_system_count( )' method (described below under GObject's decrement_system_count( ) Method) rather than call the 'lose( )' method.

Full details as to how all of these actions preferably are coordinated in the SmartPtr's methods are described below under SmartPtr Methods.

C. Smart Pointer Adjectives

Now that we have described the basic behavior which the various flags in the SmartPtr provide, we can begin to catalog the most important combinations of these flags and give them names. These names will help explain the major preferred SmartPtr types (see Table 2).

1. Any pointer with its 'is_owning_ptr' flag set to true can be described as an owning pointer or an ownership pointer. Since GeMS system utilizes use-counts to assert ownership, these pointers may are also referred to as use-count pointers.
2. Any pointer having both its 'is owning_ptr' and 'is_registered_ptr' flags set to true is called a strong pointer. Thus, all strong pointers are also owning pointers.
3. Any pointer having its 'is_owning_ptr' flag set to false and its 'is_registered_ptr' flag set to true is called a weak pointer, since it does not prevent the garbage collection of the referenced object.
4. Any pointer with both its 'is_owning_ptr' and 'is_registered_ptr' flags set to false is known as a blind pointer, since it can state nothing about the existence of the object referenced (whether it has been deleted or not). (For reasons known to one skilled in the art, in practice blind pointers must be used with extreme care or avoided entirely.)
5. Any pointer having its 'is_omega_ptr' flag set to true is known as an omega pointer.
6. Any pointer having its 'is_ghost_ptr' flag set to true is known as a ghost pointer.
7. Any pointer having its 'is_ghost_ptr' set to false is called a living pointer.
8. Any pointer having its 'is_alpha_ptr' set to true is known as an alpha pointer.

When a designer designs a data model for an application only strong and weak (i.e., registered) pointers should generally be used. (I.e., normally the 'is_registered_ptr' flags will be set to "true.") (The 'is_registered_ptr' flag is preferred to be present, however, since there are times when it is advantageous to automatically set this flag to 'false'; for example, to prevent unwanted registration of pointers when a series of pointer deletions occurs.) Forcing the application designer/programmer to use only strong nor weak pointers means that application pointers can never dangle. In other words, they can never point to a GObject after it has been deleted.

Note that a pointer can be either strong or weak and still have the omega, ghost, alpha, or living adjectives applied to it. In fact, having a strong omega ghost pointer is completely valid, although its omega behavior is completely inactive since it is a ghost pointer (see Table 1). (Non-registered pointers should be blocked from applying their 'is_omega_ptr' flags, so a blind omega pointer is still blind.)

When designing a computer system that uses GeMS, the designer typically will think in terms of the strong, weak, alpha, and omega adjectives. However, it is unlikely that the designer need consider the ghost adjective since applications only utilize living references.

TABLE 2

Pointer Nomenclature

| | Owning = True (also referred to as owning or use-count pointer) | Owning = False |
|---|---|---|
| Registered = true | Strong pointer (also an Owning pointer) | Weak pointer |
| Registered = false | Owning pointer | Blind pointer |

Although the most preferred embodiment of GeMS incorporates all of the functions available through the flags discussed above, significant benefits may be achieved by limited implementation of these functions. For example, the utility of the omega function alone allows a designer the desirable ability to determine garbage collection behavior for a given GObject or set of GObjects.

Figure 9:
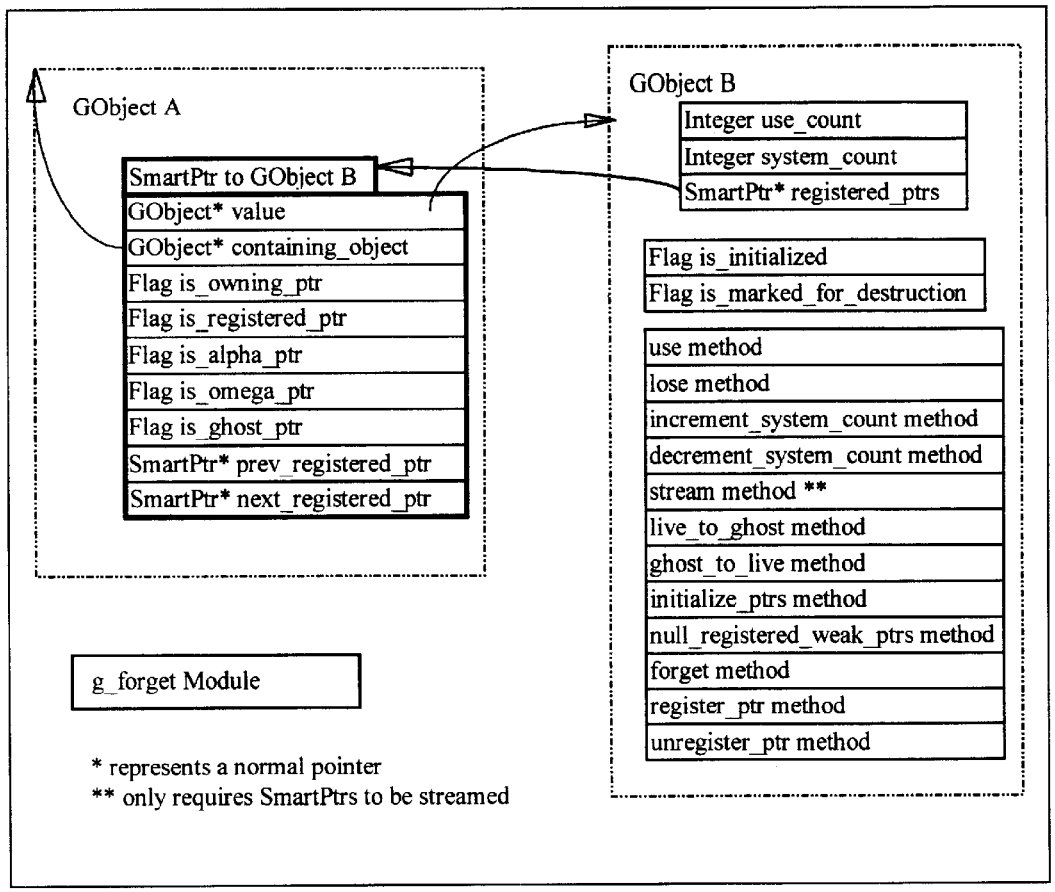
FIG. 9 is a chart demonstrating an embodiment with ghost pointer functions without undo/redo features.

In a preferred embodiment, a history based undo/redo system is integrated into GeMS and demonstrates how the GeMS concepts can be manipulated to work in such an environment. However, such an undo/redo system is not required to utilize all or some of the basic GeMS concepts of living, ghost, strong, weak, alpha, and omega pointers. For instance, ghost pointers, while utilized heavily by the undo/redo system have other potential uses besides how they are described herein. More specifically, they are useful for implementing system functions on objects where the system does not want to prevent an object's 'death' during the operation of the function, but does want to prevent its destruction. A strong ghost pointer referencing said object will not interfere with its death and will keep it from being deleted. FIG. 9 provides an overview of a GeMS embodiment utilizing ghost pointers but omitting a history based undo/redo system.

Figure 10:
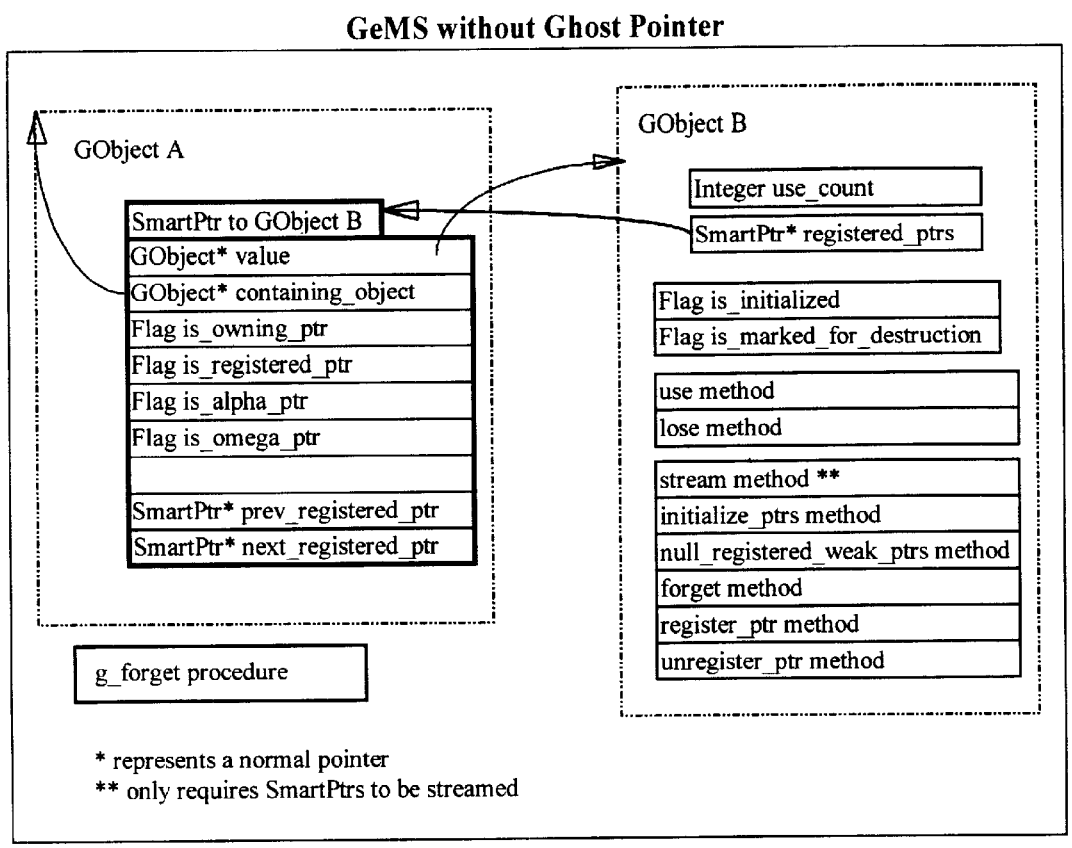
FIG. 10 is a chart demonstrating an embodiment without ghost pointer functionality.

Similarly, although highly useful for the implementation of system services such as an undo/redo facility, the capability of creating a 'ghost' pointer is not required to implement a system based on the GeMS memory management scheme. FIG. 10 gives an overview of a GeMS embodiment omitting ghost pointers. As compared to the full use of the preferred GeMS features described herein, in such a non-ghost system: (1) Since the SmartPtr has no 'is_ghost_ptr' attribute, wherever the description references the flag, the attribute is treated as if it is always false; (2) since there is no 'live_to_ghost' method, the method is never called; (3) since there is no 'increment_system_count' method, call 'use( )' instead when the description says to call 'increment_system_count'; (4) since there is no 'decrement_system_count' method, call 'lose( )' instead when the description says to call decrement_system_count'; and (5) since there is no 'system_count', there is no distinction between an object's 'death' and its 'destruction' and, consequently, the alpha pointer will be triggered to kill the object it references upon the referencing object's destruction.

III. Pointer Counting

A. Limitations of Previous Use-Count Pointers

As stated above, a use-count system requires that every object have an integer use_count attribute which maintains a count of the number of owning references pointing to the object. Whenever a new living owning reference is made to a GObject (i.e., a smart pointer having its 'is_owning_ptr' flag set to true is made to reference an object), its use-count is incremented in its 'use( )' method (described below under GObject's use( ) Method). Conversely, whenever a living owning reference to the GObject is lost, the use-count must be decremented (via its 'lose( )' method—described below under GObject's lose( ) Method). When the use-count of a GObject drops to zero, the system knows that the GObject is no longer needed and should be garbage collected. This is very common memory management technique used by the software industry as a whole.

The technique of use-counts has other, more severe, limitations than just requiring a use-count on every object. Consider this scenario: GObject X contains a use-count pointer pointing to GObject Y, incrementing its use-count by 1. GObject Y, in turn, contains a use-count pointer pointing to GObject X, also incrementing its use-count. Since X points to Y, Y's use-count cannot drop to zero until X is destroyed. Since Y points to X, X's use-count cannot drop to zero until Y is destroyed, and thus neither can be destroyed. Because of this inherent problem, use-count pointers cannot be used exclusively to model and maintain data structures of arbitrary complexity.

However, with some modifications to this common technique, the usefulness of use-counts can be greatly augmented. Even with these modifications, the data model's use-count relationships must still be structured in a hierarchical acyclic graph fashion, but other relationship types may be added to the model to produce cyclic references which are not owning references.

B. System-Count vs. Use-Count

In GeMS system, every GObject preferably has two integers acting as use-counts rather than one. The first use-count (named 'use_count' in FIG. 1) simply counts the number of owning relationships referencing the GObject (as described above). The second use-count (named 'system_count' in FIG. 1) counts the number of ghost owning relationships referencing the GObject (i.e., which originate in GeMS undo/redo system or from other system activities). (Thus, the use_count value can never fall below the system_count value since any relationship incrementing the system_count will also increment the use_count as well.) The GObject's dies when the use_count value is decremented to equal the value of the system_count. (At this point, the GObject exists only as a 'ghost' in the undo/redo system.) The object's memory is not actually freed back to the operating system until both the use_count and system_count drop to zero (i.e., no ghost strong reference exists). Thus, this aspect of GeMS prevents an owning relationship from dangling (point to an object which has been destroyed).

The reason for delaying the destruction of any 'dead' GObject is simple. If, for example, the data model (or document) is modified by the user in such a way that all 'living' references to a GObject are lost (thereby decrementing the use-count to equal the system_count), the user-interface must be updated accordingly. However, the forgotten object should not be totally deleted from the system since the user may thereafter perform an 'undo' to retrieve it (thereby 'resurrecting' it). When the use_count drops to a value equaling the system_count, the object has outlived its usefulness to the user and is no longer accessible (except via an undo). When both the use_count and system_count drop to zero, the object is no longer needed for any purpose and its memory may be freed.

Since the relationships look to the 'is_ghost_ptr' flag to determine their specific behavior, it is GeMS system's responsibility to set and clear these flags in the smart pointers contained within each GObject when it 'dies' or is 'resurrected'. This task is accomplished through the use of streams (as described below).

Note that it should be possible to implement a similar system where the system_count and use_count are more independent of one another. For example, an object 'dies' when its use-count drops to zero but its memory is not freed until both the use-count and system-count drop to zero. The important point here is that the number of living and ghost owning pointers referencing a given GObject be maintained. In fact, the system can be made to work if even less information is maintained. At a minimum, the system must be able to determine when the number of ghost strong references to an object drops to zero, when the number of living strong references drops to zero, when the number of ghost strong references equals zero, when the number of living strong references equals zero and, if the undo/redo system is in place, when the number of living strong references rises above zero and the number of ghost strong references is non-zero.

C. Additional Note on Use-Counts

Since ownership in a data model must be represented in an acyclic fashion, there must be some top-level entity which owns, directly or indirectly, the entire data model. This can be accomplished by having a living strong SmartPtr, external to the data model, which points to the highest level GObject in the data model. It is important that this highest level GObject remain alive while the data-model exists, however, since the external SmartPtr cannot be updated by the undo/redo system should an undo ever be performed. Consequently, it is a good practice to have a special subclass of GObject, say GDocument, which exists as long as a data model resides in memory. (Its existence can most easily be enforced by encapsulating the external SmartPtr into a special wrapper object that does not allow direct access to the SmartPtr.)

D. Preventing Weak Pointer from Dangling

Any relationship in the preferred GeMS system which does not increment the use-count of the referenced object is effectively a non-owning relationship. The vast majority of these will still register themselves with the referenced object (i.e., are weak pointers). These types of relationships are highly important in that they fill in the gaps left by the strong pointers. All living weak pointers referencing a GObject which dies are automatically broken (cleaned-up) by GeMS memory management system at the end of the referenced GObject's 'lifetime'. For example, if a living weak pointer is set to point to an object which object thereafter 'dies', the pointer's value will be set to lNULL via the forget( ) method of the GObject containing the weak pointer (The forget( ) method is described below under GObject's forget( ) Method). Thus, it is impossible for a weak relationship to 'dangle' (point to an object whose memory has been freed back to the system).

In the preferred GeMS scheme every GObject is to keep track of all living strong and living weak pointers referencing the GObject. When the GObject's lifetime is over, it steps through the current list of registered relationships and cleans them up before expiring. The preferred technique to accomplish this NULLing process is described below under The GObject's null_registered_weak_ptrs( ) Method.

Note that good object-oriented programming technique demands that an object's is data values not be changed directly by any external agent because it is each object's responsibility to maintain the integrity of its own internal data. Consequently, the weak pointers should not be NULLed without somehow informing the GObject containing the relationship that this is happening. This is the main purpose of the 'containing_object' pointer depicted in FIG. 1. If the 'containing_object' pointer of any smart pointer is NULL, the system can only assume that the smart pointer is a variable external to any GObject and, thus, will break the relationship directly.

E. Non-Owning Relationships in the Undo/Redo System

While living weak relationships to an object are indeed broken (NULLed) at the end of that object's 'life', it is important to note that those weak references which existed in the past (and consequently still exist as weak ghost pointers in the rollback system) are not broken. Whether the relationship is kept or broken depends, once again, on the flag maintained within each relationship indicating whether it is a ghost relationship or a living one (named 'is_ghost_ptr' in FIG. 1). Those relationships kept only for system purposes (ghost relationships) are not broken. (In fact, ghost relationships do not register themselves with their referenced GObject at all so it is impossible for a GObject to NULL them out.)

Note that there are many variations in which an undo/redo system can be created. Each possibility must be coordinated properly with the registering and unregistering of pointers. This coordination can be aided by the use of an 'is_rolling_back' flag (as shown in FIG. 1) on every GObject. This flag should be set by the undo/redo system prior to any undo or redo to let an object know that a rollback situation is happening so that it can react accordingly. After the rollback action is performed, the flag should be cleared.

For example, the preferred undo/redo system described below delays the creation of backup-images for GObjects as long as possible to save memory space. Thus, while an undo is being performed, a backup image of every GObject representing its state prior to the undo is created immediately before its state is altered to match that of the target state. This enables a redo to be performed later. However, since the creation of this image is delayed so long, there is a possibility that an object will 'die' during an undo operation triggering the NULLing of any weak pointers referencing it. If those weak pointers are contained within other objects, the NULLing process may occur before those other objects have their own backup-image's created for the future redo. Consequently, when an object dies, it should check the 'is_rolling_back' flag of any objects containing weak pointers referencing it. Those weak pointers that are contained in objects which are rolling back should not be immediately NULLed (so their values can be preserved for a future redo) and should remain registered with the object. There shouldn't be any problem with delaying this breakage since the preferred rollback system itself guarantees to set those objects to their target states anyway, which means they will be NULLed (or altered to point to other objects) by virtue of this fact.

IV. Base Class GObjects

A. "Killing" a GObject

In the preferred GeMS, every living strong pointer registers itself with the GObject it references and, since the data model is expected to be conceptually designed with only strong and weak pointers, the GObject has access to every living smart pointer referencing it. As described above, a GObject's registry is used to NULL out any living weak pointers referencing it when it dies. However, pointer registry can also be used when a designer or the memory manager determines that a given object should be killed. Rather than requiring the computer designer/programmer to write a special utility for every object containing the knowledge of what relationships must be broken to "kill" the object, a system function may be provided to perform the task in a generic fashion. This procedure is named g_forget( ) in the preferred embodiment of GeMS system. It accomplishes its task by scanning the list of registered pointers of the given object and NULLing any strong pointers found. The exact procedure is described below in The g_forget( )

Procedure. As long as there are no living use-count pointers referencing the GObject which are not strong pointers, this process results in the GObject's use-count being decremented to equal its system-count, effectively 'killing' the object (and, consequently, NULLing any living weak pointers referencing the object as well). When the GObject 'dies', any SmartPtrs it contains are converted into ghost pointers, thereby incrementing the system-counts of any GObjects it owns (the use-counts are decremented from the loss of a strong living reference and then re-incremented by the gain of the strong ghost reference—producing no net change in the use-count itself), possibly 'killing' them as well. In addition, any pertinent alpha or omega relationships that are affected by the object's death will trigger their own specialized behaviors, possibly killing other GObjects. These effects would continue to ripple through the data model until all GObjects which are no longer needed as a consequence of the user's action are 'killed'. Here again, GeMS undo/redo system would retain all of the necessary information to 'undo' the user's action.

B. GObject Base Class

As discussed above, it is preferred that every class which is to be managed by GeMS memory management and undo/redo systems be derived, directly or indirectly, from a common base class whose instances are always allocated on the system heap. This common base class is called 'GObject'. It is this class which manages the use-count, system-count, and registered pointers described above. In addition, it declares certain virtual methods which must be overloaded by derived classes for this preferred embodiment. These methods and their purpose are fully described below, but a list of them is provided here for reference (in C++ syntax):

1. Methods which must be overloaded:
   virtual GObject*type( );
   virtual void stream(g_stream&);
2. Other methods:
   virtual void initialize( );
   virtual void forget(g_forget_event&);
   virtual void use( );
   virtual void lose( );
   void increment_system_count( );
   void decrement_system_count( );
   void ghost_to_live( );
   void live_to_ghost( );
   void register_ptr(SmartPtr&);
   void unregister_ptr(SmartPtr&);
   void backup( );
   void null_registered weak_ptrs( );
   void initialize_ptrs( );

C. GObject Exemplars

An exemplar, in short, is an object which represents the existence of a class and its inheritance relationships to other classes. Exemplars are a well-understood technology and are discussed in detail in available texts such as *Advanced C++ Programming Styles and Idioms* by James O. Coplien published by Addison-Wesley Publishing Company, 1992. If the undo/redo capabilities of GeMS are used, every managed class (derived from GObject directly or indirectly) preferably must declare and define an exemplar, derived from the basic GeMS exemplar, which will be referred to as g_type. The g_type class has the virtual method 'construct( )' which returns a pointer to a new GObject and accepts no parameters. The purpose of the method is to simply construct an instance of the class which the exemplar represents (using the class's default constructor).

For example, suppose we had a class named MyClass which is derived from GObject. The declaration of MyClass must itself declare an exemplar class, which we shall call my_class_type for the purpose of this example, derived from g_type. After the declaration of the new class, MyClass must then declare a static instance of my_class_type and give it a name, say MyClassType. The class my_class_type must overload its 'construct( )' method to allocate and initialize a MyClass object using MyClass's default constructor and return the resulting object.

In addition to declaring its exemplar, every class managed by GeMS system must overload its virtual type( ) method. This method simply returns a pointer to the class's exemplar. Thus, in our example, MyClass's type( ) method would simply return a pointer to MyClassType.

Typically the exemplar methods may be implemented with a single macro in the class declaration and a single macro in the object's definition (source) file.

V. Wrappers

A wrapper is an object which 'wraps' the functionality of another class for ease of use by a designer/programmer and is commonly utilized in the software industry to simplify programs. For example, a wrapper may be constructed around all of the objects that make up a linked list so that the implementation details are hidden. In GeMS, wrappers advantageously are used to enable designer/programmers to easily incorporate sets and lists of smart pointers into GObjects. In the preferred embodiment, all wrappers are derived from the base class Wrapper, which has no base class of its own and has no attributes of its own, but does define some virtual methods which enable GeMS system to communicate with them. These methods are stream( ), is_affected_by( ), and forget( ). To implement a wrapper class in GeMS system, these methods must be overridden to provide the system with the functionality it needs. More detailed explanations of these methods are provided below under Wrapper Methods.

A. Sets, Lists, and Other Collections

While the smart pointer techniques described above allow automatic memory management and infinite undo/redo for basic data structures, they only handle the problem of determining when an object should remain alive, when it should die, and when it should be resurrected. They do nothing to mitigate the difficulties involved with manipulating the structure of the data for efficient representation and retrieval. In a preferred aspect, GeMS library also provides collection classes (which are implemented with wrappers). Two of the most important ones are lists and sets. A list is simply a sequenced collection of smart pointers which does not allow NULL values to be contained but which does allow multiple instances of the same pointer to be inserted into the list. A set is very similar to a list in that it is a sequenced collection of smart pointers and that it does not allow NULL values to be contained. However, a set will not allow more than a single instance of any given pointer value to be contained within the collection. Thus, a list allows duplicates; a set does not.

The techniques involved with efficiently manipulating and representing lists, sets, and other collection types are commonly understood by those skilled in the programming arts and are therefore not discussed in this disclosure. (For a full discussion on the matter, see available texts on the subject, such a *Data Structures an Advanced Approach Using C* by Jeffrey Esakov and Tom Weiss published by Prentice Hall, 1989).

Like all common collections, GeMS collections allow elements to be added and removed from them. In GeMS system, which allows weak relationships, the memory management and undo/redo systems have additional repercussions to collections. When a GeMS object is 'killed' or otherwise 'dies', any living relationships still referencing the object are broken. If one such relationship is contained within a GeMS collection which does not allow NULL values to be contained, this is equivalent to removing the object from the collection. In addition, an undo thereafter is equivalent to adding the object back into the same collections. Any such addition or removal is an important event in which the user-interface of an application may be interested.

The mechanism by which a GeMS collection can prevent NULL pointers from 1 a being contained is relatively straightforward once the virtual forget( ) method of GObject is understood. GeMS guarantees that the forget( ) method will be called on any GObject containing a relationship that is about to be broken. Since most collections consist of a number of internal nodes to hold the collection's data, and since the nodes themselves must be derived from GObject, each node is informed when its contents are about to be NULLed. To react to the event, the node must overload its forget( ) method and take whatever actions are necessary for the collection containing it. Commonly, this means that every node will need to have a pointer to its owning collection or wrapper so that the collection can be informed of the situation. (Here, note that a pointer to a wrapper is not a SmartPtr since wrappers are not derived from GObject and SmartPtrs can only reference GObjects. Consequently, pointers to wrappers must be 'normal' memory pointers. This doesn't present any difficulties from a memory management standpoint, however, since the nodes are themselves 'wrapped' and hidden away by the wrapper, so all references to the nodes themselves are completely predictable.)

Note also that, if the wrapper contains at least a single SmartPtr, then it will have access to its containing object since every SmartPtr is initialized with a reference to its containing object by virtue of the initialize_stream. Of course, this means that the wrapper must present its internal SmartPl:rs to the initialize_stream in its overloaded stream( ) method and the containing object must provide the wrapper to the stream in its own stream( ) method. (Note that the wrapper only presents the SmartPtrs directly embedded within the wrapper. If it references a node of some sort with a SmartPtr, only the SmartPtr is given to the stream. The node's own stream( method will handle the node's attributes.)

B. Omega Collections

It is not generally useful to have collections of omega pointers, because the behavior of an omega pointer 'kill' the collection node containing the omega pointer when the memory manager NULLs it. This could have drastic consequences for the collection as a whole. For example, if a linked list contained nodes with omega pointers and one of those pointers was NULLed by GeMS system (forcing a g_forget( ) on a list node), all of the subsequent nodes would also be lost since they would no longer be referenced by any living strong pointer. Consequently, for practical reasons most collections will not be designed allow the 'is_omega_ptr' flag to be set to true for any SmartPtrs they contain.

However, the concept of a collection which kills its containing object when GeMS system removes its only remaining element is a very useful concept. Such collections are known as omega collections. Omega collections contain non-omega pointers, but will themselves kill their containing objects when the omega collections detect that they are being taken from a non-empty state to an empty state by the memory manager.

If a wrapper is to have 'omega' functionality, then the wrapper must either always be an omega wrapper or contain within it some flag indicating that it has omega behavior. If it is an omega wrapper, the wrapper must perform a g_forget( ) on its containing object when the memory manager nulls the last remaining SmartPtr managed by the wrapper collection. This is the purpose of the wrapper's forget( ) method, which must be called by the nodes contained within the wrapper when their own forget( ) methods are called by the memory manager. In effect, the nodes have the responsibility of informing the wrapper when the memory manager NULLs their contents.

VI. Data Model Events

Many modem software modules today have special services known as 'event handlers' whose primary purpose is to inform other software modules when some pre-defined event occurs. Although not necessary for GeMS to perform its memory-management functions, users of GeMS can benefit greatly by an event handler capable of informing them when certain memory management functions take place. Event handlers can be implemented in a variety of ways and is a well-understood technology, so a full description of them is omitted. Some of the important events that users would find useful are listed below.

A. Update and Death Events

GeMS preferably provides every managed GObject event handlers for two basic events. These events are 'death', and 'update'. The 'death' event for a GObject occurs when its use-count drops to equal the system-count. That is, it occurs when the object 'dies'.

An 'update' event for an object occurs when the value of the GObject changes in some way. These events can only be triggered automatically if the GeMS undo/redo facility is enabled. As described elsewhere, the undo/redo facility stores a single backup image of every object whose value changes for every noted state of the data model. (The GeMS system 'knows' when a GObject's value changes because all GObjects are required to call their backup( ) methods prior to any change). Since the undo/redo facility contains the information of what objects changed value, it can easily trigger 'update' events for each of those objects as soon as the application tells the undo/redo facility to note that data model's state. For example, if a GObject's value changes and the undo system is instructed to note the data model's state, an update event for the changed GObject occurs. If an undo is then done to take the data model back to its previous state, another update event for the changed GObject occurs. Finally, if a redo is performed to take the GObject back to its former state, yet another update event occurs.

Note that, although an event occurs signifying an object's 'death', there is no corresponding event handling an object's 'birth' or 'resurrection'. The reason for this is twofold. First, it is unnecessary since the only time an object becomes 'living' is when some other portion of the data model creates a new reference to it in some way via a smart pointer (thereby incrementing its use-count). Since the referencing portions of the data model will obviously change as a consequence, the appropriate 'update' events on those parts of the model will be called to inform the user-interface of the object's existence. The second reason is that, since a GObject is obviously not accessible before it exists or after it dies, there is no proper way to request an event from the GObject itself (although it would be possible to request that the system alert on when any GObject is born or resurrected). Fortunately, the other events triggered by the object's birth are more than sufficient to handle user-interface requirements.

B. User Specified Add and Remove Events

There are really only two fundamental events of interest when dealing with collections. The first is when a pointer is added to a collection. The second is when it is removed. (Re-ordering of a collection simply boils down to a number of adds and removes. However, a 'massive collection change' event could be used in these cases instead for efficiency concerns.) Both the 'add' and 'remove' events must be handled by any collection implemented in GeMS system. The events must provide enough information for the user-interface to determine exactly where in the collection the element was added or from where it was removed.

VII. Streams

A stream is a class which accepts a typed data sequence and does something with it. The data sequence, obviously, must be made up only of the types of data for which the stream is designed to handle and the stream must somehow be able to tell the type of each data piece. What the stream actually does to the data, in the abstract, is irrelevant in determining whether an object can be labeled a 'stream'. If an object accepts a sequence of typed data of indeterminate length and does something with it, it is a stream. (Streams are a well-understood technique in the software industry, so their implementation details are omitted.)

Streams preferably are used extensively in GeMS system to accomplish a variety of tasks. The data types which GeMS streams are capable of accepting are all references to a specified group of data types. This group consists of:

1. byte, 2 byte, and 4 byte signed and unsigned integers
2. single and double precision floating point numbers
3. smart pointers (as described above)
4. arrays of the above data types whose size may be queried and altered.
5. null terminated arrays of the 1 byte and 2 byte integers whose size may be queried and altered.
6. an aggregate class (Wrapper) which may be subclassed by designer/programmers for convenience but which must be entirely made up of combinations of these 6 data types.

If the GeMS undo/redo facility is omitted, the streams can be considerably simplified as well since the only tasks for which they are needed is in performing various tasks dealing with SmartPtrs. Thus, only those data types listed above dealing with SmartPtrs will be needed.

In order to support the important GeMS streaming tasks, each object managed by GeMS system must be derived, directly or indirectly, from a specific base class (GObject). This class has a virtual method (named 'stream( )') that must be overloaded by derived classes. This method has no return value and only a single parameter: a reference to a g_stream object. The purpose of the method is to provide the given g stream object (see FIG. 2) with a sequence of valid data types. The sequence provided represents the current state of the GObject being streamed. For most GObject's, the stream( ) method is unconcerned with what the given g_stream actually does with the provided data.

A. The Copy_stream

The copy stream object's task is to extract an object's state (via its 'stream( )' method), and copy that state into another object of the same type (through the second object's stream( ) method) so that the data is streamed out of one object (temporarily stored into a memory buffer of some kind) and then streamed into the other object. The copy stream's only purpose is to make backup image copies of an object for use in the undo/redo system and to restore an object's state to that of a backup image, so if the undo/redo system is not used, the copy_stream is unnecessary.

The copy stream's functionality is augmented by an additional flag (named 'mark_copy_as_backup') which is, by default, set to false. If set to true, the copy_stream will perform the additional task of setting any streamed smart_ptr's 'is_ghost_ptr' attribute to true when streaming in the data to the copy. This will effectively make any references from the backup copy increment both the system-count and use-count of any referenced objects, thus preserving ghost relationships in the undo/redo system.

B. The Behavior_Stream

The behavior stream will take an object with living references and transform them into ghost references or visa-versa. It 'knows' which direction to go ('ghost to live' or 'live to ghost') based on an internal flag (named 'direction') which is set by the user of the stream.

The stream accomplishes its task by scanning an object's attributes and looking for smart pointers. Any that are encountered will have their 'is_ghost_ptr' flag altered, thereby changing their behaviors. When changing the flags, the use-count, system-count, and pointer registries of the referenced object must be updated accordingly. To do this, the object is first assigned to a temporary SmartPtr whose 'is_owning_ptr' and 'is_ghost_ptr' flags are set, thereby incrementing the use-count and system-count of the object. The smart pointer scanned by the stream is set to point to null, its 'is_ghost_ptr' flag is altered (depending on whether the stream is performing a 'ghost to live' or 'live to ghost' operation), and the object is reassigned to the pointer. Finally, the temporary pointer is set to null.

If the behaviors stream encounters an alpha reference while transforming living references into ghost references, it must also kill the object referenced by the alpha pointer. In effect, the behaviors stream is fulfilling the alpha pointer's promise to kill the referenced object when the alpha pointer itself dies.

C. The Initialize_stream

The initialize stream simply steps through a given object's data members looking for smart pointers. Whenever one is found, it sets the smart pointer's 'containing_object' attribute to point to the object being streamed. An initialize_stream is used on every GObject the first time its use( ) method is called (such as by assigning it to a strong pointer).

VIII. Undo/Redo Functionality

Figure 11:
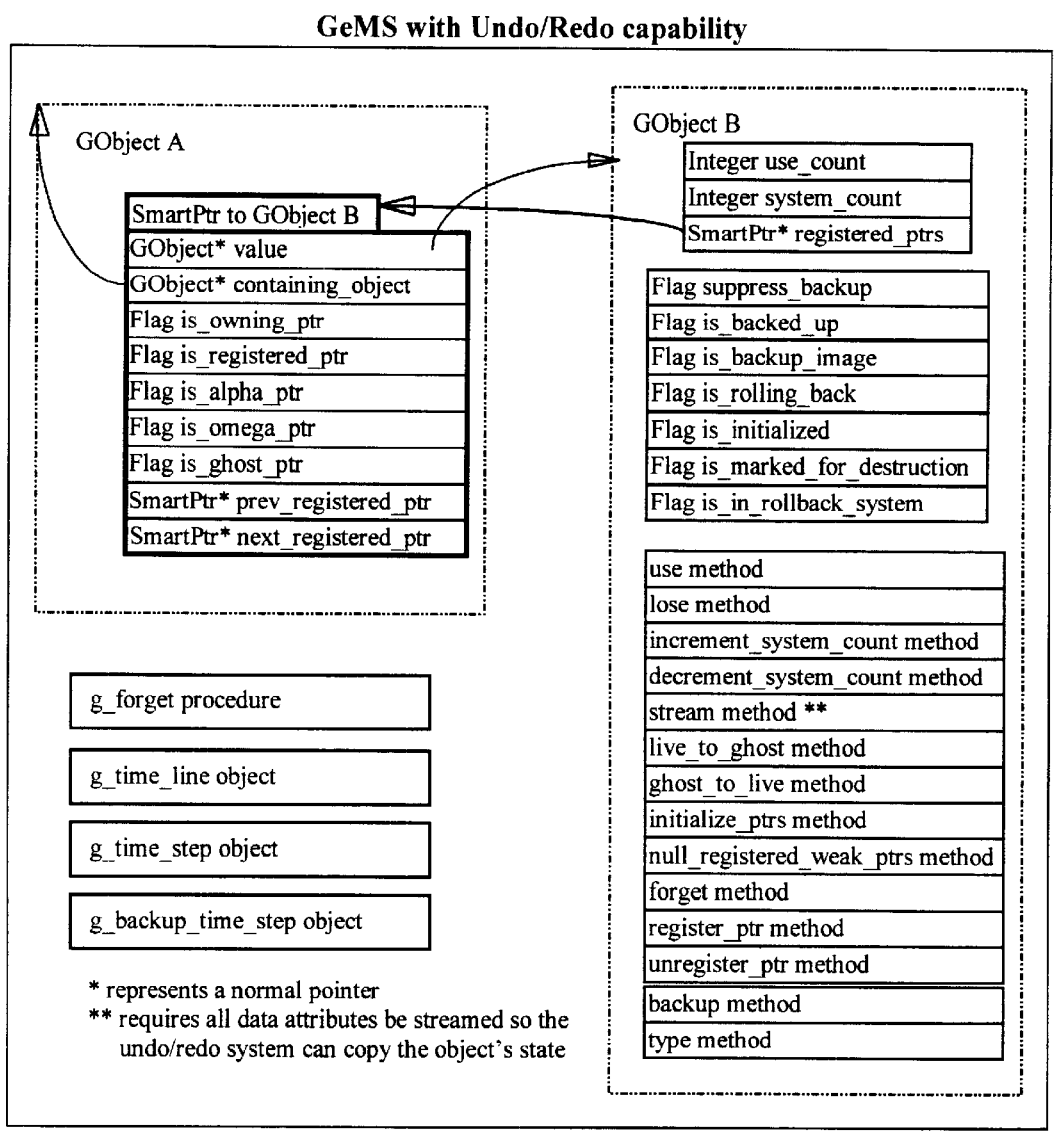
FIG. 11 is a chart demonstrating an embodiment with undo/redo functionality.

Now that we have discussed the various types of data model events which are important in this embodiment of GeMS system and the streaming techniques used by GeMS to obtain and alter an object's state, we can turn to a description of how GeMS may be configured to accomplish undo/redo tasks. (Refer to FIG. 11 for an overview of GeMS incorporating Undo/Redo capabilities.) First, though, it would aid the discussion of how the undo/redo system's internals work if we describe the actions GeMS library users must go through to use the undo system of one preferred embodiment of GeMS.

A. Activating the Rollback System

The rollback system preferably is turned off in its default state and must explicitly be set up by the user if one needs Undo capabilities. In one sense this may be implemented by the programmer creating a g_time_line object and set the active time line global pointer (named 'active_time_line' in FIG. 3) to point to this object. While a given g_time_line is active, any data model change will be registered with it.

B. Noting a State

Once a g_time-line is active, any alterations to the data model will be noted. However, the user obviously does not want to have to click on Undo for every single bit change in the data model. The user will generally make a single action which can potentially change many objects in the data model. Every undo/redo request he makes will be expected to undo or redo an entire action. When a document is modified sufficiently that its data is in a state to where the user may eventually want to 'undo' back, the state of the document should be noted. This is accomplished with the g_time_line's note_state( ) method (described below under g_time_line's note_state( ) Method).

C. Using Undo and Redo

To determine whether the undo system is capable of performing an undo or redo, g_time_line provides the 'can_undo( )' and 'can_redoo' methods (described below under g_time_line Methods). These methods will return 'true' if there is anything to undo or redo. If an undo is needed, the data model can be taken back to the previously noted state and any pertinent data model events will be triggered by simply calling the g_time_line's undo( ) method (described below under g_time_line Methods). Similarly, if the user requests a redo, the previous changes to the model can be reintroduced by calling the g_time_line's redo( ) method.

D. Freeing Up Memory

Programs often disallow undos beyond specific points to save memory. The times chosen are those where the user has the least chance of needing to undo steps. The most common point is just after the user has saved his data to file. This feature can be placed anywhere in the application by calling the g_time_line's commit( ) method (described below under g_time_line Methods).

E. Undo/Redo Components

Figure 3:
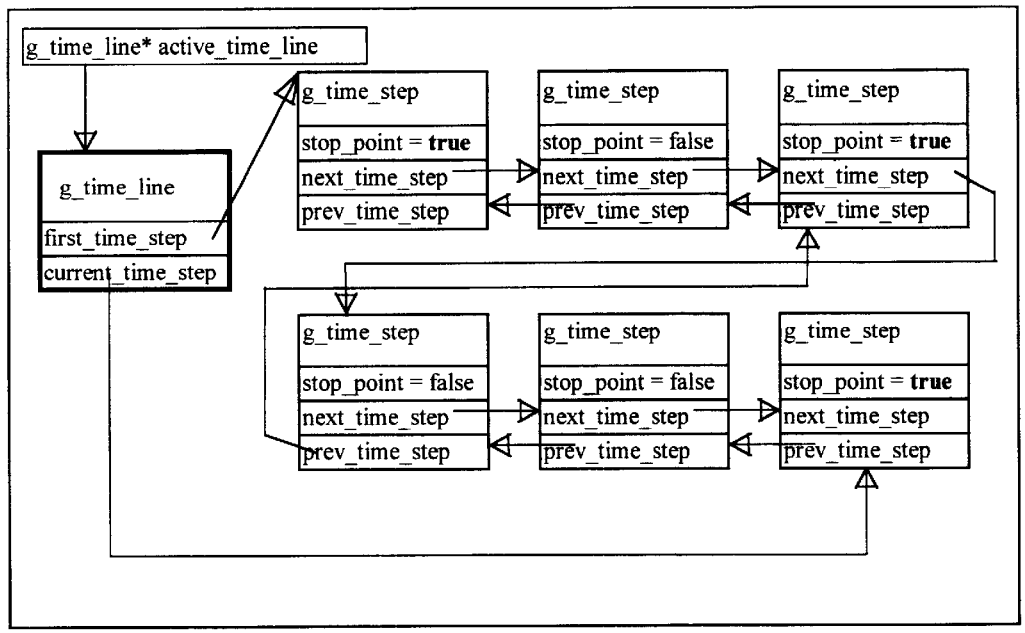
FIG. 3 is a logic chart demonstrating attributes of time line activations.

A g_time_line manages a doubly linked list of g_time_step objects, each of which represents a data model alteration or event (such as the addition of an element to a collection). This basic data structure is illustrated in FIG. 3. Each of these g_time_steps has the virtual methods pre_undo( ), undo( ), post_undo( ), pre_redo( ), redo( ), post_redo(, post operation( ), and note_state( ). In addition, each has a flag named 'stop_point which is set to true if the g_time_step represents the point at which a note_state( ) was received by the document. It is this point at which the undo/redo system will halt after an undo or redo is requested.

When a g_time_line object is constructed, it first creates a basic g_time_step with its 'stop_point' flag set to true. This initial g_time step serves no purpose other than as a stopping point placeholder. This is not absolutely necessary, but it simplifies the undo/redo code enough to justify the memory overhead. The g_time_line's first_time_step and current_time_step pointers are set to point to this initial g_time_step.

F. Various g_time_steps Play Different Roles

Other than the initial placeholder g_time_step, all subsequent g_time_steps are more specialized in that each has a specific role to play in the preservation of the document's various states. Perhaps the most important is the g_backup_time_step object (derived from g_time_step), which performs the important role of backing up a single object's state. Other g_time_steps record the occurrence of events, such as the addition or removal of an element from a list or set. Each of these specialized g_time_step objects performs their roles by overloading their various g_tim_step methods.

G. The g_backup_time_step

The g_backup_time_step is the most common and arguably the most important type of g_time_step in the system. This particular class has the responsibility of noting the state of a given GObject and preserving that data for later use in an undo or redo operation. Its various methods are described below under g_backup_time_step Methods.

H. Other g_time_step Subclasses

Whenever an event of some importance occurs, it may be recorded in the time line for later undoing and redoing. Such events occur, for example, when collection classes have elements added or removed from them. While the actual data model's state (and therefore the state of the collection classes themselves) is entirely handled by the g_backup_time_step class, the g_backup_time_step does not trigger any events (other than update events) to inform the user-interface of many data-model changes. Events other than update events must be handled by separate specialized g_time_step objects.

For example, in one embodiment, the list object in GeMS system defines two subtypes of g_time_step. One is named g_list_add_event and the other is g_list_remove_event. A g_list_add_event is inserted into the active g_time_line's linked list of g_time_steps whenever a new element is added to a list. A g_list_remove_event is inserted into the active g_time_line whenever an element is removed from a list. These time steps have all of the information needed to inform the user-interface of what was added or removed, to which list it was added or removed, and where in the list the element was added or removed.

The g_list_add_event overrides the g_time_step's post_undo( ) method to trigger an 'element removed from list' event. Thus, the undoing of the addition of an element to a list is equivalent to the removal of the same element. In addition, the g_time_step's post_redo( ) method is overloaded to trigger an 'element added to list' event.

Conversely, the g_list_remove_event overrides the g_time_step's post_undo( ) method to trigger an 'element added to list' event. Thus, the undoing of the removal of an element from a list is equivalent to the addition of the same element. In addition, the g_time step's post_redo( ) method is overloaded to trigger an 'element removed from list' event.

In the preferred embodiment, similar g_time_steps are created for the other GeMS collection classes in order to trigger the proper events at the proper times to fully inform the user-interface of data model changes. In all cases, the user-interface is not actually informed of a specific event unless it has somehow requested to be informed when the events occur.

IX. Preferred Method Descriptions

There are a wide variety of approaches to implementation of GeMS consistent with the scope of the invention detailed in the attached claims. The following specific computational methods have been found to have various advantages, as generally discussed below.

A. GObject Methods

GObject's Constructors

In the GObject's constructors, all of the various flags should be initialized to false and the registered_ptrs pointer should be set to NULL.

GObject's Destructor

The GObject's destructor really has nothing to do since, by the GObject's destruction, there should be no remaining registered pointers. However, tests can be performed on these entities at this point to ensure that everything has been properly cleaned up.

GObject's use( ) Method

The use( ) method must first increment the GObject's use_count. Next, if the 'is initialized' flag is false (as shown in FIG. 1), it should be set to true and then the initialize( ) and initialize_ptrs( ) methods should be called. Otherwise, if the use_count is one greater than the system counl the GObject has just been resurrected. In this case, the ghost_to_live( ) method should be called.

GObject's lose( ) Method

The GObject's lose method should perform the following tasks:
1. Upon entering the lose( ) method, the GObject's 'is_marked_for_destruction' flag (as shown in FIG. 1) should be stored in a local variable named here as 'was_marked_for_destruction' for use later.
2. Decrements the use_count.
3. If use_count now equals zero, the is_marked_for_destruction flag should be set to true.
4. If the use_count equals the system_count and 'was_marked_for_destruction' is false, the GObject must be 'killed' as follows (steps 4.a to 4.e):
    a. increment the use_count and system_count (to prevent the object's destruction during the operation),
    b. if event handlers are being used, trigger a 'death event' for the GObject,
    c. call the GObject's live_to_ghost( ) method,
    d. call the GObject's null_registered_weak_ptrs( ) method.
    e. decrement the use_count and system_count.
5. If the use_count equals zero and 'was_marked_for_destruction' is false, delete the GObject (calling its destructor and freeing its memory back to the system).

GObject's initialize_ptrs( ) Method

The task of the initialize_ptr( ) method is to set the 'containing_object' pointers of any smartpointers contained within the GObject to point to the GObject. This is accomplished by applying an initialize_stream to the GObject. (The initialize_stream will, in turn, call the GObject's stream( ) method, passing itself as the stream.) Whenever a SmartPtr is presented to the initialize_stream, the stream will set the 'containing_object' pointer to point to the GObject being streamed.

GObject's increment_system_count( ) Method

The increment_system_count( ) method simply increments both the use_count and system_count attributes of the GObject.

GObject's decrement_system_count( ) Method

The decrement_system_count( ) method decrements both the use_count and system_count attributes. If the use_count is then equal to zero, the GObject is deleted (calling its destructor and freeing its memory back to the system).

GObject's initialize( ) Method

The GObject's initilize( ) method is mainly intended to be overloaded by users of the system so that an object may be informed when its construction is complete. All the GObject needs to do is, to call its backup( ) method here.

GObject's stream( ) Method

The GObject's stream( ) method, which accepts a single parameter of a reference to a g_stream, is mainly intended to be overloaded by users of the system so that an object's attributes may be streamed to the system. The system uses this information for purposes of reading an object's current state into the undo/redo system, restoring the object's attributes to previous or former states, initializing the object's smart pointers, and setting and clearing the is_ghost_ptr' flags in the object's smart pointers at appropriate times. None of GObject's attributes (flags, use-counts, etc.) need to be streamed and in fact shouldn't be since they are managed directly by GeMS system. Consequently, GObject's own stream( ) method does nothing.

GObject's null_registered_weak_ptrs( ) Method

The null_registered_weak_ptrs method is conceptually simple but difficult to implement properly. Its task is to NULL out any weak pointers referencing the GObject. Consequently, its implementation is highly symmetrical to that of the g_forget( ) procedure, whose task it is to NULL out any strong pointers pointing to a given GObject. The null_registered_weak_ptrs method is handled as follows:
1. If the GObject's registered_ptrs attribute is NULL, there is nothing to do and the method may immediately return.
2. Since the method only wants to alter the values of weak pointers, the registered pointers list is broken up into two distinct doubly-linked lists (utilizing the SmartPtrs' next_registered_ptr and prev_registered_ptr attributes): one containing weak pointers, the other containing strong pointers. Every weak pointer should have the following actions performed on it (steps 2a to 2b):
    a) If the pointer's containing_object attribute is non-NULL and the containing_object's 'is_rolling-back' flag is false, call the containing_object's increment_system_count( ) method to prevent its possible destruction during the procedure.
    b) The pointer's is_registered_ptr flags should be set to false (to prevent the possibility that the pointer will attempt to unregister itself with this object or re register itself with another object during the procedure).
3. Set the GObject's registered_ptrs attribute to point to the doubly-linked list of strong pointers.
4. For every pointer in the weak pointers list, if its containing_object attribute is NULL simply set its 'value' attribute to NULL. Otherwise, perform the following actions (steps 4a to 4b):
    a) If the 'is_rolling_back' flag of the containing_object is false, call the containing_object's backup( ) method and then call its forget( ) method (passing a g_forget_event referencing the current SmartPtr).
    b) If the use_count of the current pointer's containing_object is still greater than its system_count, and the SmartPtr is still pointing to the GObject whose null_registered_weak_ptrs method is being executed, set the 'value' attribute of the SmartPtr to NULL to force its compliance. This step acts as a check to make sure the forget( ) method was not overloaded and redefined in such a way as to avoid its required task.
5. Now that we have NULLed out the weak pointers, we must recover from the operation. For every pointer in the weak pointers list, perform the following actions (steps 5a to 5d):
    a) Set its 'next_registered_ptr' and 'prev_registered_ptr' attributes to NULL.
    b) Set its 'is_registered_ptr' flag to true.
    c) If the weak pointer is non-NULL (was assigned to point to something else in the forget( ) method above) and its 'is_ghost_ptr' flag is false, register the pointer with the referenced object (via the referenced object's register_ptr( ) method).
    d) If the weak pointer's 'containing_object' attribute is non-NULL and the containing_object's 'is_rolling_back' flag is false, call the containing_object's -decrement_system_count( ) method.

Gobject's forget( ) Method

Figure 2:
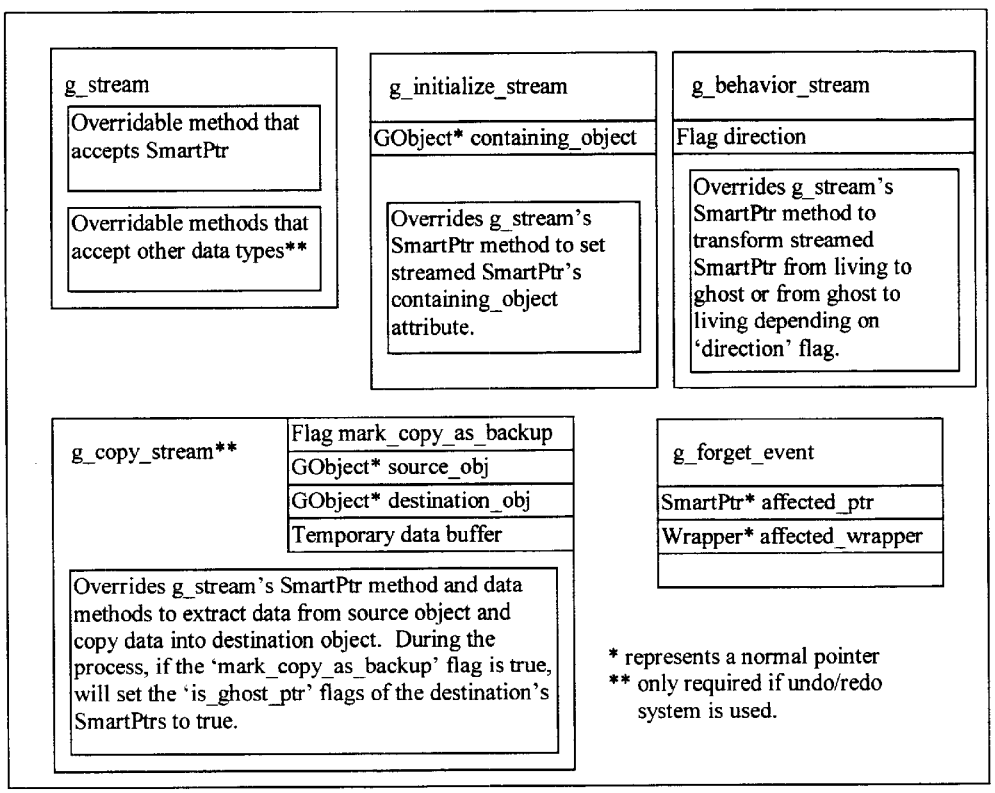
FIG. 2 is a logic chart demonstrating aspects of streams and wrappers.

The forget( ) method accepts a single parameter which is a reference to a g_forget_event (as shown in FIG. 2).

Before being passed into the forget( ) method, the g_forget_event's affected_ptr attribute must be set to point to the SmartPtr which is to be NULLed by the method. In addition, if the SmartPtr is contained within a wrapper within the GObject, the g_forget_event's affected_wrapper attribute must be set to point to the wrapper, otherwise, its value must be NULL.

If the passed g_forget_event's 'affected_wrapper' attribute is non-NULL, the forget( ) method of the affected_wrapper is called passing along the g_forget_event as its sole parameter and the method returns. This allows the wrapper to react appropriately to the NULLing process of its contained SmartPtr. Otherwise, if the 'is_omega_ptr' flag of the SmartPtr pointed to by the g_forget_event's affected_ptr attribute is true, the GObject is passed to the g_forget( ) procedure, thus killing it. Finally, the value of the SmartPtr is set to NULL (thereby triggering the smart pointer actions such as decrementing any use-count, un registering, etc.).

GObject's backup( ) Method

The backup( ) method first checks to see if the global 'active_time_line' pointer (as shown in FIG. 3) is NULL or if the GObject's 'is_backed_up' flag is set to true. If either is the case, the method immediately returns. Otherwise, the backup( ) method of the active_time_line is called, passing a reference to the GObject as its sole parameter.

GObject's live_to_ghost( ) Method

The GObject live_to_ghost( ) method's job is to set the 'is_ghost_ptr' flags to true for all SmartPtrs contained within the object, performing all of the SmartPtr actions required by the behavior change. To accomplish this goal, the method first checks the GObject's 'is_in_rollback_system' flag (as shown in FIG. 1). If its value is false, the GObject's backup( ) method is called. Next, a behavior_stream is constructed with its 'direction' attribute set to 'live to ghost'. The stream is then applied to the GObject and the method returns.

GObject's ghost_to_live( ) Method

The GObject ghost_to_live( ) method's job is to set the 'is_ghost_ptr' flags to false for all SmartPtrs contained within the object, performing all of the SmartPtr actions required by the behavior change. To perform this task, a behavior_stream is constructed with its 'direction' attribute set to 'ghost to live'. The stream is then applied to the GObject and the method returns.

GObject's register_ptr( ) Method

The register_ptr( ) method accepts a reference to a single SmartPtr. Its job is to insert the given SmartPtr into the GObject's doubly-linked list of registered pointers. Linked lists are well-understood practices in industry so the details are omitted.

GObject's unregister_ptr( ) Method

The unregister_ptr( ) method accepts a reference to a single SmartPtr. Its job is to remove the given SmartPtr from the GObject's doubly-linked list of registered pointers. Linked lists are well-understood practices in industry so the details are omitted.

B. The g_forget( ) Procedure

This procedure could be implemented as a method of a GObject, since it takes a single parameter which is a pointer to a GObject. However, since the GObject will usually die during the execution of the procedure, and since it is undesirable for its actions to be overloaded in any way, it is better implemented it as a separate procedure. This procedure's job is 1 (. conceptually simple but difficult to implement properly. It must NULL out any strong pointers referencing the given GObject. Consequently, its implementation is highly symmetrical to that of the null_registered_weak_ptrs( ) procedure, whose task it is to NULL out any weak pointers pointing to a given GObject. The g_forget( ) procedure is handled as follows:

1. If the GObject's registered_ptrs attribute is NULL, there is nothing to do and the procedure may immediately return.
2. Cycle through all of the registered pointers in the GObject's list and count those that are strong pointers. If the accumulated number is less than the GObject's use_count minus its system_count, there are still some non-registered owning references pointing to the object. The g_forget( ) will therefore not kill the object anyway, so we should return without breaking any strong references. (There's no reason to break the strong references when the weak references won't be broken as well by the object's death.)
3. Since the method only wants to alter the values of strong pointers, the registered pointers list is broken up into two distinct doubly-linked lists (utilizing the SmartPtrs' next_registered_ptr and prev_registered_ptr attributes): one containing weak pointers, the other containing strong pointers. Every strong pointer should have the following actions performed on it (steps 3a to 3b):
   a) If the pointer's containing_object attribute is non-NULL, call the containing_object's increment_system_count( ) method to prevent its possible destruction during the procedure.
   b) Set the pointer's is_registered_ptr to false (to prevent the possibility that the pointer will attempt to unregister itself with this object or re-register itself with another object during the procedure).
4. Set the GObject's registered_ptrs attribute to point to the doubly-linked list of weak pointers.
5. Call the passed GObject's increment_system_count( ) method. (This will prevent the GObject's destruction during the procedure.)
6. For every pointer in the strong pointers list, if its containing_object attribute is NULL simply set its 'value' attribute to NULL. Otherwise, perform the following actions (steps 6a to 6b):
   a) If the 'is_rolling_back' flag of the containing_object is false, call the containing_object's backup( ) method and then call its forget( ) method (passing a g_forget_event referencing the current SmartPtr).
   b) If the use_count of the current pointer's containing_object is still greater than its system_count, and the SmartPtr is still pointing to the passed GObject, set the 'value' attribute of the SmartPtr to NULL to force its compliance. This step acts as a check to make sure the forget( ) method was not overloaded and redefined in such a way as to avoid its required task.
7. Now that we have NULLed out the strong pointers, we must recover from the operation. For every pointer in the strong pointers list, perform the following actions (steps 7a to 7d):
   a) Set its 'next_registered_ptr' and 'prev_registered_ptr' attributes to NULL.
   b) Set its 'is_registered_ptr' flag to true.
   c) If the strong pointer is non-NULL (was assigned to point to something else in the forget( ) method above) and its 'is_ghost_ptr' flag is false, register the pointer with the referenced object (via the referenced object's register_ptr( ) method).

d) If the strong pointer's 'containing_object' attribute is non-NULL and the containing_object's 'is_rolling_back' flag is false, call the containing_object's decrement_system_count( ) method.

8. Call the passed GObject's decrement_system_count( ) method. (To recover from the previous increment_system_count( ) call.)

C. SmartPtr Methods

SmartPtr's Constructors

The SmartPtr's constructors must be passed the values of the 'is_owning_ptr', 'is_registered_ptr', 'is_omega_ptr', 'is_alpha_ptr', and 'is_ghost_ptr' flags. The 'value', 'next_registered_ptr', and 'prev_registered_ptr' attributes are all set to NULL.

SmartPtr's Destructor

The SmartPtr destructor must perform the following tasks:

1. if the 'value' attribute is NULL the destructor may immediately return.
2. if the 'is_ghost_ptr' flag is true the following action must be performed (steps 2.a to 2.b):
   a) if the 'is_owning_ptr' flag is true, call the 'decrement_system_count( ) method of the GObject pointed to by 'value';
   b) otherwise, return.
3. otherwise, the following actions must be performed (steps 3.a to 3.c):
   a) if the 'is_registered_ptr' flag is true, call the 'unregister_ptr( )' method of the GObject pointed to by 'value', passing a reference to the SmartPtr as the sole parameter;
   b) If the 'is_alpha_ptr' flag is true, kill the GObject referenced by the SmartPtr's 'value' attribute by passing it to the g_forget( ) procedure; and
   c) if the 'is_owning_ptr' flag is true, call the 'lose( )' method of the GObject pointed to by the SmartPtr's 'value' attribute.

SmartPtr's assignment( ) Method

A SmartPtr's logical value is altered by an assignment( ) method which accepts a single parameter (which we shall name 'right' for the purposes of this description) which is a reference to the GObject to which the SmartPtr should point. To do so, the following actions must be performed:

1. If 'right' equals the SmartPtr's 'value' attribute, no change is necessary so the method should immediately return.
2. If 'value' is non-NULL and the 'is_registered_ptr' flag is true and the 'is_ghost_ptr' flag is false, the unregister_ptr( ) method of the GObject referenced by 'value' should be called, passing a reference to the SmartPtr as its sole parameter.
3. If 'right' is non-NULL and the 'is_ghost_ptr' is true and the 'is_owning_ ptr' flag is true, the increment_system_count( ) method of the GObject referenced by 'value' should be called.
4. If 'right' is non-NULL and the 'is_ghost_ptr' is false and the 'is_owning_ptr' flag is true, the use( ) method of the GObject referenced by 'values ' should be called.
5. A local variable pointer, which we'll name old_value for purposes of this description, should be declared and have its value set to point to the same GObject referenced by the 'value' attribute.
6. Set the 'value' attribute to equal 'right'.
7. If 'old_value' is non-NULL and the 'is_ghost_ptr' and 'is_owning_ptr' flags are both true, call the decrement_system_count( ) method of the GObject referenced by old_value.
8. If 'old_value' is non-NULL and the 'is_ghost_ptr' is false and the is_owning_ptr' flag is true, call the lose( ) method of the GObject referenced by old_value.
9. If 'right' is non-NULL and the 'is_registered_ptr' flag is true and the 'is_ghost_ptr' flag is false, call the register_ptr( ) method of the GObject referenced by 'right' passing a reference to the SmartPtr as its sole parameter.

D. Wrapper Methods

Wrapper's stream( ) Method

The stream( ) method accepts a g_stream reference as its sole parameter. At the Wrapper level, there are no attributes to stream so the method does nothing. Overloaded methods have the responsibility of streaming the wrapper's attributes to the given g_stream Wrapper's is_affected_by( ) Method The is_affected_by( ) method accepts a reference to a g_forget_event and returns a flag indicating whether the g_forget_event will affect the wrapper. By default, the method returns false. This method must be overridden by any wrapper in GeMS system to indicate whether the given g_forget_event will affect the wrapper's contents.

Wrapper's forget( ) Method

The forget( ) method accepts a single reference to a g_forget_event. Its task is to NULL out the value of the smart pointer indicated by the g_forget_event. By default, the Wrapper's forget( ) method performs the following actions:

1. If the 'is_omega_ptr' flag of the indicated SmartPtr is set to true, the g_forget( ) procedure is called passing the value of the SmartPtr's containing_object as the parameter.
2. Otherwise, the SmartPtr's value is set to NULL (thereby triggering the smart pointer actions such as decrementing any use-count, unregistering, etc.)

If the wrapper is an omega wrapper, its forget( ) method should be overloaded so that it can react properly to a 'forget' request that removes the wrapper's last remaining element. In this case, it should kill the GObject containing it, if any.

E. g_time_line Methods g_time_line's backup( ) Method

When a GObject's value is about to change, it is the designer/programmer's responsibility to call the GObject's backup( ) method. Before performing any work, this method first checks to determine if there is a currently active g_time_line object. It does this by looking at a global pointer which will be set to point to the active g_time_line if one is active (named 'active_time_line' in FIG. 3). If there is no active g_time_line, the global pointer value will be set to NULL and the backup( ) method will immediately return. In order to ensure that only a single instance of the GObject is backed up for every state noted in the undo/redo system, each GObject has a flag (named 'is_backed_up' in FIG. 1) which indicates whether the GObject has already been backed up since the previous note_state( ). If there is an active g_time_line and the 'is_backed_up' flag is false, the GObject will call the g_time_line's backups method, passing itself as the sole parameter.

In the g_time_line's backups method, it first sets the global 'active_time_line' pointer to NULL, thus ensuring that none of the g_time_step's actions are themselves backed up. Next, it creates a new g_backup_time_step object which copies the passed GObject's state (producing a ghost image of the given GObject). This process is described below under Constructing a g_backup_time_step. The newly created g_backup_time_step is then inserted in the g_time line's list of g_time_steps at the point indicated by its 'current_time_step' attribute as described in Inserting a Time Step. At this point, the global pointers are restored to their former values and the backup( ) operation is complete.

g_time_line'note_state( ) Method

Noting a data model state is done whenever the g_time_line's note_state( ) method is called. Doing this is surprisingly easy. First, the 'active_time_line' global pointer is set to NULL to prevent any of the g_time_line's actions from being backed up themselves. Next, the g_time_line steps back through its list of g_time_steps starting from the g_time_step pointed to by 'current_time_step' and ending with the first encountered g_time_step to have its 'stop_point' flag set to true. For all g_time_steps but the last (with the 'stop_point' of true), the virtual note_state( ) method is called. For most g_time_steps, the note_state( ) method does nothing, but any g_backup_time_step triggers an 'update' event for the GObject referenced by its 'object' 412355 v1 55 attribute and then sets that GObject's 'is_backed_up' flag to false in preparation for any new alterations to the data model. After all note_state( ) methods have been called, the 'stop_point' flag of the current g_time_step is set to true and the global pointers are restored.

g_time_line's insert_time_step( ) Method

When a new g_time_step is inserted, it is always added at the location indicated by the g_time_line's 'current_time_step' attribute. If there are any elements following the 'current_time_step' location, they are removed from the list and destroyed before the new g_time_step is inserted. The reason for this is that the current_time_step attribute is intended to point to the location in the time line representing the current state of the data model. If there are it elements in the time line after the current_time_step, that means the user must have performed an undo at some point and then made some change to the data model (causing the backup( ) method to be called). If the user performs an undo and then makes a change, that effectively means he is abandoning any possible redo operations in favor of the change he is making. Thus, any g_time_steps following the current_time_step are, at this point, no longer needed. Once the new g_time_step is inserted, the current_time_step attribute of the g_time line is set to point to it.

g_time line's undo( ) Method

The implementation of the undo method of the g_time_line is a little tricky. At first thought, you would think that it would be valid to call the undo( ) method only after a note_state( ) has been performed and before the data model has changed thereafter. However, it is actually valid to have an undo( ) method called when the time line has not been told to note the state yet. This can occur when the user has made a slight innocuous alteration to the data model without being aware of the change. For example, a query method could be written in such a way that, for efficiency purposes, it 'remembers' the previous query result in case the same query is made on the next call. In doing so, it may alter a pointer to the previously queried data element when the programmer calls the query. Technically, the data model's structure changed slightly but the query's user has no way of knowing this fact. The easiest solution to this problem is to merge the latest g_time_steps into the previous state. The easiest way to do this is to perform a note_state( ) to complete the initialization of the latest time_steps and then set the previous stop_point to false so that the undo will go back to the stop_point before that. (Note that the 'unflagging' should only occur if the g_time step is not the very first one in the g_time_line's list.)

After any unnoted g_time_steps have been merged into the current state, we must set the 'active_time_line' global pointer to NULL to ensure that the g_time_line's actions are not themselves backed up.

Next, the g_time_line makes four passes through its g_time_steps starting from the current step, iterating through the 'prev_time_step' pointers of each step, and ending with the first g_time_step to have its 'stop_point' flag set to true. On the first pass, each time step excluding the last will have its 'pre_undo( )' method called. On the second pass, each time step excluding the last will have its 'undo( )' method called. On the third pass, each time step excluding the last will have its 'post_undo( )' method called. Finally, on the fourth pass, each time step excluding the last will have its 'post_operation( )' method called. After all this is done, the g_time_line's 'current_time step' pointer will be set to point to the last g_time_step, making it the new current time step.

Finally, the 'active_time_line' global pointer is restored and the undo operation is complete.

g_time_line's redo( ) Method

The implementation of the redo method of the g_time_line is far less tricky than the undo was. First, if the 'next_time_step' pointer of the 'current_time_step' is set to NULL, there is nothing to redo and we should immediately return. Next, we must set the 'active_time_line' global pointer to NULL to ensure that the g_time_line's actions are not themselves backed up.

Next, the g_time_line makes four passes through its g_time_steps starting from the current step, iterating through the 'next_time_step' pointers of each step, and ending with the first g_time_step to have its 'stop point' flag set to true. On the first pass, each time step excluding the first will have its 'pre_redo( )' method called. On the second pass, each time step excluding the first will have its 'redo( )' method called. On the third pass, each time step excluding the first will have its 'post_redo( )' method called. Finally, on the fourth pass, each time step excluding the first will have its 'post_operation( )' method called. After all this is done, the g_time_line's 'current_time_step' pointer will be set to point to the last g_time_step, making it the new current time step.

Finally, the 'active_time_line' global pointer is restored and the redo operation is complete.

g_time_line's can_undo( ) and can_redo( ) Methods

Establishing if an undo or redo is possible is trivial. If the g_time_step currently referenced by the g_time_line's 'current_time_step' attribute has a non-NULL 'prev_time_step' pointer, an undo is possible. If the current_time_step's 'next_time_step' pointer is non-NULL and its 'stop_point' flag is true, a redo is possible.

F. g_backup_time_step Methods

Constructing a g_backup_time_step

Figure 4:
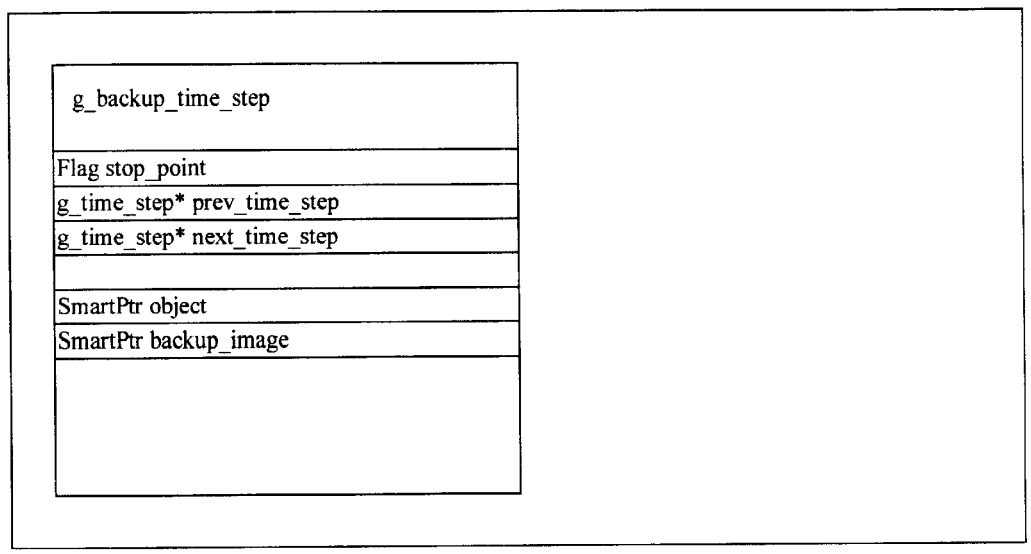
FIG. 4 is a logic chart demonstrating use of backup pointer flags.
Figure 5:
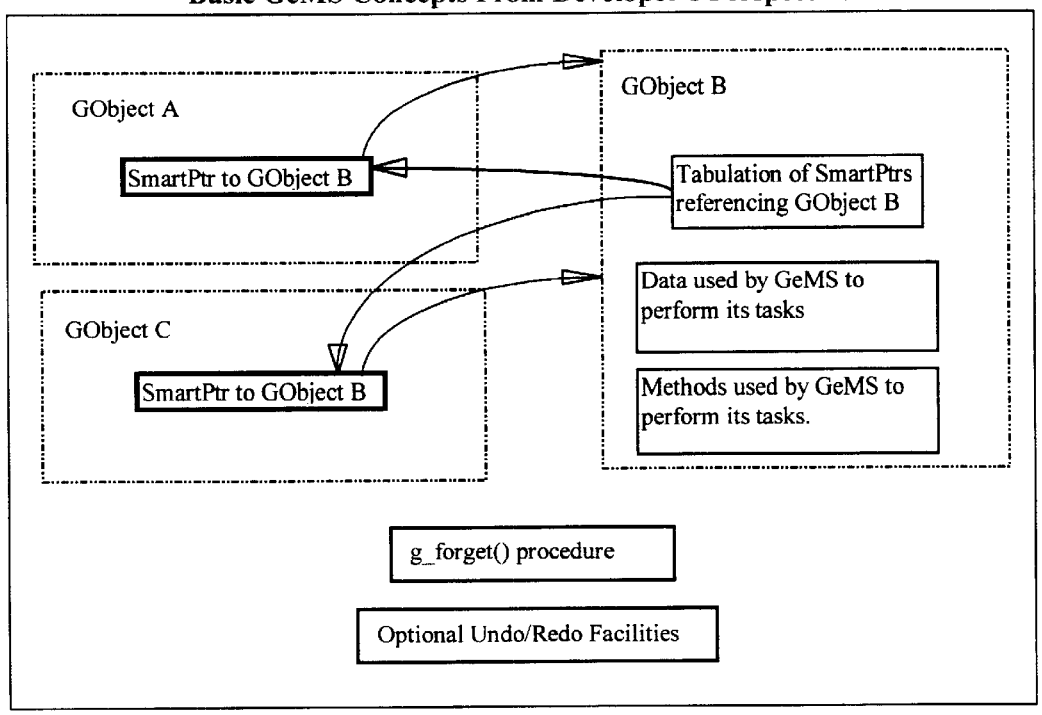
FIG. 5 is a relational chart demonstrating interrelation of various GObjects.

The g_backup_time_step object (as shown in FIG. 4) is constructed as follows. First the g_backup_time_step's smart pointers are initialized with their 'is_owning_ptr' and 'is_ghost_ptr' attributes set to true (so as to increment both the system-count and use-count of referenced objects) and their 'is_registered_ptr', 'is_alpha_ptr', and 'is_omega_ptr' flags set to false. Next, the 'object' SmartPtr is assigned to point to the GObject whose state is to be backed up and a copy of this GObject is made (using the 'construct_backup_image( )' method described below) whose address is assigned to the 'backup_image' SmartPtr.

Destructing a g_backup_time_step

To be sure that the GObject is backed up in the future, the 'is_in_rollback_system' flag of the GObject pointed to by 'object' is set to false.

g_backup_time_step's construct_backup_image( ) Method

The 'construct_backup_image( )' method performs a copy of the GObject pointed to by the 'object' attribute. The copy is made as follows. First, the GObject's exemplar is obtained by calling its type( ) method and the exemplar is told to create a new GObject of the given type by calling its construct( ) method (The resulting GObject is assigned to the time step's 'backup_image' pointer). Next, the 'is_backup_image' flag (as shown in FIG. 1) is set to true on the new GObject to indicate that it is being used as a backup image in the undo/redo system. Finally, the data from the passed GObject is copied into the backup image by the use of a copy_stream (described above) with its 'mark_copy_as_backup' attribute set to true.

g_backup_time_step's note_state( ) Method

If the g_backup_time_step's 'object' attribute is NULL, nothing needs to be done and the method immediately returns. Otherwise, an 'update' event is triggered for the referenced GObject and its 'is_backed_up' flag is set to false.

g_backup_time_step's pre_undo( ) Method

If the g_backup_time_step's 'object' attribute is NULL, nothing needs to be done and the method immediately returns. Otherwise, the GObject's use-count is incremented (via the GObject's use( ) method) to prevent the possibility of multiple deaths and resurrections of the referenced object during the undo operation.

g_backup_time_step's undo( ) Method

The undo( ) method performs the actual alteration of the referenced GObject's state to a previous state. If the g_backup_time_step's 'object' attribute is NULL, nothing needs to be done and the method immediately returns.

Before we take the GObject back to its previous state, we must first note its current state in case a redo is eventually requested. The backup_image of the g_backup_time_step is noted and stored in a temporary smart pointer (whose 'is_owning_ptr' and 'is_ghost_ptr' flags are true) before the g_backup_time_step's 'construct_backup_image( )' method is called (thus overwriting the 'backup_image' pointer with the current state). Finally, the actual undo is performed on the GObject by using a copy_stream whose mark_copy_as_backup' attribute is set to false. The data streamed into the GObject is that which was previously referenced by the temporary smart pointer. Before returning, the temporary smart pointer is NULLed (thus freeing the old backup image).

g_backup_time_step's post_undo( ) Method

If the g_backup_time_step's 'object' attribute is NULL, nothing needs to be done and the method immediately returns. Otherwise, the use-count of the GObject referenced by 'object' is decremented (via its 'lose( ) method) to recover from the increment performed in the 'pre_undo( )' method.

g_backup_time_step's pre_redo( ) Method

If the g_backup_time_step's 'object' attribute is NULL, nothing needs to be done and the method immediately returns. Otherwise, the GObject's use-count is incremented to prevent the possibility of multiple deaths and resurrections of the referenced object during the redo operation.

g_backup_time_step's redo( ) Method

The redo( ) method performs the actual alteration of the referenced GObject's state to a state at which it existed before an 'undo( )' occurred. If the g_backup_time step's 'object' attribute is NMJLL, nothing needs to be done and the method immediately returns.

In case an undo is eventually requested again, before we take the GObject back to its previous state, we must first note its current state. The backup_image of the g_backup_time_step is noted and stored in a temporary smart pointer (whose 'is_owning_ptr' and 'is_ghost_ptr' flags are true) before the g_backup_time_step's 'construct_backup_image( )' method is called (thus overwriting the 'backup_image' pointer with the current state). Finally, the actual redo is performed on the GObject by using a copy_stream whose 'mark_copy_as_backup' attribute is set to false. The data streamed into the GObject is that which was previously referenced by the temporary smart pointer. Before returning, the temporary smart pointer is NULLed (thus freeing the old backup image).

g_backup_time_step's post_redo( ) Method

If the g_backup_time_step's 'object' attribute is NULL, nothing needs to be done and the method immediately returns. Otherwise, the GObject's use-count is decremented (via its lose( ) method) to recover from the increment performed in the 'pre_redo( )' method.

g_backup_time step's post_operation) Method

If the g_backup_time_step's 'object' attribute is NULL, nothing needs to be done and the method immediately returns. Otherwise, if the GObject's use-count is greater than its system-count, an update event is triggered for the referenced object.

X. Alternative Embodiments

In computer systems using garbage collection methodologies other than reference counting, typically any object having no outstanding strong object references will be garbage collected and thereby deleted at the time of the next garbage collection cycle. In such systems, the GeMS alpha and omega functions would be enabled to break strong object references, allowing the objects to be deleted.

Further, various classes of object references could be supported directly rather than unifying all of the intelligent pointer behavior into a single class. In such a system, the memory manager would need to recognize the various smart pointer types so that their specific behaviors are properly performed. Similarly, an abstract base class smart pointer could be formed with sufficient methods to inform the pointers when their various actions should be performed. The various smart pointer types would inherit concrete classes from this abstract pointer class and overload the methods to perform their specific tasks.

In yet another alternate embodiment, various process other than stream may be used to manipulate the smart pointers and, optionally, create backup images of objects in the undo/redo system. One such technique would be to simply have methods on the objects specifically designed for these tasks rather than have a single stream method designed to be used for multiple purposes.

The alpha and/or omega tagging concepts could be implemented without adjectives described above by simply providing the developer a process (e.g., macro) of 'killing' an IT object by breaking all living strong references to said object. Such an implementation would be required to "inform" any object containing a reference that would be broken by this means when the contained references are being broken so that said object could respond appropriately.

In a further GeMS embodiment, a plurality of object types could be supported rather than requiring all memory-managed objects to be inherited from a single base class. Of course, such a system would require the smart pointers to distinguish between such object types to facilitate proper communication with each object type.

Alternately, GeMS could be configured to forego the NULLing process of omega pointers and simply trigger the death of the object containing an omega pointer when the object referenced by the omega pointer dies (or is killed). Since the containing object will be killed anyway, the step of setting the omega pointer to a NULL state could be eliminated.

In another embodiment, the tabulation of smart pointers referencing a given object will have a structure other than a doubly-linked list. Such tabulation could be managed with any of a variety of other data structures, including, but not limited to, binary trees and arrays.

The specific implementation of GeMS and its smartpointers concept is subject to a wide variety of embodiments. Thus, the exemplary and preferred embodiments discussed herein are not intended to limit the scope of GeMS, but, rather, such scope is defined by the claims appended hereto.

I claim:

1. A Generic Memory System (GeMS) for management of a plurality of objects in an electronic digital computer system's memory, said GeMS comprising:
   a plurality of pointers, each said pointer tagged as a strong pointer or a weak pointer and, further, tagged as a living pointer or a ghost pointer wherein each of said objects maintains a tabulation of all living pointers referencing said object, whereas said object detects when a total number of living strong pointers referencing said object equals zero and said object detects when a total number of ghost strong pointers referencing said object equals zero; and
   a killing routine whereby the living strong pointers within said tabulation of said object may be nulled; whereas when the total number of living strong pointers referencing said object equals zero, any pointers contained within said object are transformed from living pointers into ghost pointers and any weak pointers within said tabulation are nulled; and whereas when the total number of living strong pointers referencing said object equals zero and the total number of ghost strong pointers referencing said object equals zero, said object is deleted.

2. The GeMS as claimed in claim 1 where said pointer is tagged as an omega pointer or a non-omega pointer and said pointer is initialized to contain a reference to a containing object containing said pointer, whereas if said pointer is nulled by said GeMS system, and if said pointer is an omega pointer, then any strong pointers referencing said containing object are nulled.

3. The GeMS as claimed in claim 2 further comprising a wrapper containing a collection of pointers, said wrapper tagged as an omega wrapper or a non-omega wrapper and said wrapper referencing a containing object and wherein said containing object is informed when a pointer of said collection of pointers contained within each said containing object is nulled and wherein said wrapper is informed when a pointer contained within said wrapper is nulled and wherein said wrapper removes any pointer from said wrapper's contents when such pointer is nulled and whereas when such wrapper removes such wrapper's last remaining pointer due to such nullification, if said wrapper is an omega wrapper, then any strong living pointers referencing said containing object are nulled.

4. The GeMS as claimed in claim 2 where said pointer is tagged as an alpha pointer or a non-alpha pointer whereas if said pointer is transformed from a living pointer into a ghost pointer, and if said pointer is an alpha pointer referencing said object, then any strong pointers referencing said object referenced by said pointer are nulled.

5. The GeMS as claimed in claim 2 further comprising a history-based undo/redo system wherein sequential states of interest can be noted by said computer system's programmer and wherein the order in which states are noted is maintained such that said undo/redo system can determine the states immediately preceeding and following each of said noted states and wherein each of said noted states comprises backup images of those objects whose states changed from one noted state of interest to the next and wherein each of said backup images is comprised of data needed to describe the state of said object but wherein living pointers contained with said object are preserved as ghost pointers in said backup image and wherein an undo operation can be performed given a current state and a target state to set the state of said object to the desired target state by sequentially stepping through said noted states starting from said current state and ending at said target state wherein the states of all said objects having said backup images within a noted state are set to the state indicated by the said backup image but wherein living pointers within said objects remain living.

6. The GeMS as claimed in claim 1 where said pointer is tagged as an alpha pointer or a non-alpha pointer whereas if said pointer is transformed from a living pointer into a ghost pointer, and if said pointer is an alpha pointer referencing said object, then all living strong pointers referencing said object referenced by said pointer are nulled.

7. A Generic Memory System (GeMS) for management of an object in an electronic digital computer system's memory, said GeMS comprising:
   at least one pointer tagged as a strong pointer or a weak pointer and also as an omega pointer or a non-omega pointer and wherein said object detects when a total number of strong pointers referencing said object equals zero and wherein said pointer is initialized with references to said pointer's containing object and wherein said object maintains a tabulation of pointers referencing said object; and
   a killing routine whereby any strong pointers within said tabulation are nulled, or, if any of said strong pointers within said tabulation are omega pointers, the killing routine is applied to the objects containing said omega pointers and whereas if said object detects that the number of strong pointers referencing said object equals zero, a null weak pointers process is performed whereby any weak pointers within said tabulation are nulled or, if any of said weak pointers within said tabulation are omega pointers and are not nulled, the killing routine is applied to the objects containing said omega pointers and said object is deleted.

8. A Generic Memory System (GeMS) for management of an object in an electronic digital computer system's memory, said GeMS comprising:
   at least one pointer tagged as a strong pointer or a weak pointer and as a living pointer or a ghost pointer and as an omega pointer or a non-omega pointer wherein for a living pointer referencing said object, said object maintains a tabulation including said living pointer referencing said object and wherein said object detects when a total number of living strong pointers referencing said object equals zero and said object detects when a total number of ghost strong pointers referencing said object equals zero; and
   a killing routine whereby any strong pointers within said tabulation within said object are nulled, or, if any of said strong pointers within said tabulation are omega pointers, said killing routine is applied to said object containing said omega pointers within said tabulation and whereas when said object detects that the total number of living strong pointers referencing said object equals zero, a null weak pointers process is performed whereby any weak pointers within said tabulation are nulled, or, if any of said weak pointers within said tabulation are omega pointers and are not nulled, and wherein the killing routine is applied to said object containing said omega weak pointers within said tabulation, and whereas if the total number of living strong pointers referencing said object equals zero and the total number of ghost strong pointers referencing said object equals zero, said object is deleted.

9. A process for memory management of an object in a computer system's memory, which memory comprises a plurality of strong pointers, wherein said object maintains a tabulation of said strong pointers enabling it to track which of said strong pointers reference said object, and wherein each of said strong pointers is tagged as an omega pointer or a non-omega pointer and is contained within a containing object, the process comprising the step of:

nulling any of said strong pointers within said tabulation of said omega pointer's said containing object if said omega pointer is nulled by said process.

10. A process for memory management of an object in a computer system's memory, which memory comprises a plurality of strong pointers, wherein said object maintains a tabulation of said strong pointers enabling it to track which of said strong pointers reference said object, and wherein each of said strong pointers is tagged as an alpha pointer or a non-alpha pointer, the process comprising the step of:

nulling any of said strong pointers within said tabulation of said object if an alpha pointer dies and if said object is referred to by said alpha pointer.

11. A Generic Memory System (GeMS) for management of an object in an electronic digital computer system's memory, said GeMS comprising:

at least one pointer tagged as a strong pointer or a weak pointer and, further, tagged as a living pointer or a ghost pointer wherein, for a living pointer referencing said object, said object maintains a tabulation of living weak pointers referencing said object; whereas said object detects when a total number of living strong pointers referencing said object equals zero and said object detects when a total number of ghost strong pointers referencing said object equals zero: and whereas when the total number of living strong pointers referencing said object equals zero, any pointers contained within said object are transformed from living pointers into ghost pointers and any weak pointers within said tabulation are nulled; and whereas when the total number of living strong pointers referencing said object equals zero and the total number of ghost strong pointers referencing said object equals zero, said object is deleted.

12. A system for managing an object in a memory of a computing device, the system comprising at least one pointer referencing the object with the pointer being contained within a containing object, wherein the pointer is identified as being a strong pointer or a weak pointer and as an omega pointer or as a non-omega pointer, whereas when the pointer is nulled by the system and the pointer is identified as being an omega pointer, then all strong pointers referencing the omega pointer's containing object are nulled, and when an object detects that a total number of strong pointers referencing the object equals zero, any weak pointers referencing the object are automatically nulled, any containing objects associated with the nulled weak pointers are immediately informed of the nullification, and the object is automatically deleted.

13. A system for managing an object in a memory of a computing device, the system comprising:

at least one pointer referencing the object, with the pointer being contained within a containing object, wherein the pointer is identified as being a strong pointer or a weak pointer and as an omega pointer or a non-omega pointer; and a killing routine whereby any strong pointers referencing the object may be nulled and, when the object detects that a total number of strong pointers referencing the object equals zero, any weak pointers referencing the object are automatically nulled, any containing objects associated with the nulled weak pointers are immediately informed of the nullification, and the object is automatically deleted;

whereas when a pointer is nulled by the system and the pointer is identified as being an omega pointer, then the killing routine is recursively applied to the omega pointer's containing object.

14. A system for managing an object in a memory of a computing device, the system comprising at least one pointer referencing the object, wherein the pointer is identified as being a strong pointer or a weak pointer and as an alpha pointer or a non-alpha pointer, whereas if the pointer is an alpha pointer and the pointer is destructed then any strong pointers referencing the object referenced by the alpha pointer are nulled, and when the object detects that a total number of strong pointers referencing the object equals zero, any weak pointers referencing the object are automatically nulled, any containing objects associated with the nulled weak pointers are immediately informed of the nullification, and the object is automatically deleted.

15. A system for managing an object in a memory of a computing device, the system comprising:

at least one pointer referencing the object, wherein the pointer is identified as being a strong pointer or a weak pointer and as an alpha pointer or a non-alpha pointer, whereas if the pointer is an alpha pointer and the pointer is destructed then any strong pointers referencing the object referenced by the pointer are nulled; and a killing routine whereby any strong pointers referencing the object may be nulled and, when the object detects that a total number of strong pointers referencing the object equals zero, any weak pointers referencing the object are automatically nulled, any containing objects associated with the nulled weak pointers are immediately informed of the nullification, and the object is automatically deleted.

16. A method of managing an object in a memory of a computing device, the system comprising:

(a) identifying a pointer referencing the object as being either a strong pointer or a weak pointer;

(b) identifying the pointer as being either an omega pointer or a non-omega pointer;

(c) tracking a total number of strong pointers referencing the object;

(d) detecting when the total number of strong pointers referencing the object equals zero;

(e) nulling any weak pointers referencing the object;

(f) communicating performance of step (e) to any containing objects associated with the nulled weak pointers;

(g) nulling, when a nulled pointer was identified as an omega pointer, all strong pointers referencing the containing object; and (h) communicating performance of step (g) to any containing objects associated with the nulled strong pointers; and (i) deleting the object.

17. A method of managing an object in a memory of a computing device, the system comprising:

(a) identifying a pointer referencing the object as being either a strong pointer or a weak pointer;

(b) identifying the pointer as being either an omega pointer or a non-omega pointer;

(c) initializing the pointer to contain a reference to a containing object containing the pointer;

(d) tracking a total number of strong pointers referencing the object;

(e) detecting when the total number of strong pointers referencing the object equals zero;

(f) nulling any weak pointers referencing the object;

(g) communicating performance of step (f) to any containing objects associated with the nulled weak pointers;

(h) nulling, when a nulled pointer was identified as an omega pointer, all strong pointers referencing the containing object;

(i) communicating performance of step (h) to any containing objects associated with the nulled strong pointers; and (j) deleting the object.

18. A method of managing an object in a memory of a computing device, the system comprising:

(a) identifying a pointer referencing the object as being either a strong pointer or a weak pointer;

(b) identifying the pointer as being either an alpha pointer or a non-alpha pointer;

(c) detecting when an alpha pointer is destructed;

(d) nulling any strong pointers referencing the object which had been referenced by the destructed alpha pointer;

(e) communicating performance of step (d) to any containing objects associated with the nulled strong pointers;

(f) nulling any weak pointers referencing the object which had been referenced by the destructed alpha pointer;

(g) communicating performance of step (f) to any containing objects associated with the nulled weak pointers; and (h) deleting the object.

19. A method of managing an object in a memory of a computing device, the system comprising:

(a) identifying a pointer referencing the object as being either a strong pointer or a weak pointer;

(b) identifying the pointer as being either an alpha pointer or a non-alpha pointer;

(c) initializing the pointer to contain a reference to a containing object containing the pointer;

(d) detecting when an alpha pointer is destructed;

(e) nulling all strong pointers referencing the object which had been referenced by the destructed alpha pointer;

(f) communicating performance of step (e) to any containing objects associated with the nulled strong pointers;

(g) nulling any weak pointers referencing the object which had been referenced by the destructed alpha pointer;

(h) communicating performance of step (g) to any containing objects associated with the nulled weak pointers; and (i) deleting the object.

* * * * *